(12) United States Patent
Kassas et al.

(10) Patent No.: US 12,019,173 B2
(45) Date of Patent: Jun. 25, 2024

(54) LANE-LEVEL NAVIGATION SYSTEM FOR GROUND VEHICLES WITH LIDAR AND CELLULAR SIGNALS

(71) Applicant: The Regents of the University of California, Oakland, CA (US)

(72) Inventors: Zak M. Kassas, Irvine, CA (US); Mahdi Maaref, Irvine, CA (US); Joe Khalife, Costa Mesa, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 485 days.

(21) Appl. No.: 17/270,763

(22) PCT Filed: Aug. 23, 2019

(86) PCT No.: PCT/US2019/047847
§ 371 (c)(1),
(2) Date: Feb. 23, 2021

(87) PCT Pub. No.: WO2020/041668
PCT Pub. Date: Feb. 27, 2020

(65) Prior Publication Data
US 2021/0278549 A1    Sep. 9, 2021

Related U.S. Application Data

(60) Provisional application No. 62/721,967, filed on Aug. 23, 2018.

(51) Int. Cl.
*G01S 19/48*    (2010.01)
*G01C 21/16*   (2006.01)
(Continued)

(52) U.S. Cl.
CPC .......... *G01S 19/485* (2020.05); *G01C 21/188* (2020.08); *G01S 17/89* (2013.01)

(58) Field of Classification Search
CPC ...... G01S 19/485; G01S 17/89; G01C 21/188
(Continued)

(56) References Cited

U.S. PATENT DOCUMENTS 8,154,438 B1    4/2012  Larson et al.
9,594,170 B2 *  3/2017  Kennedy ............... G01S 19/246
(Continued)

FOREIGN PATENT DOCUMENTS

EP          3267152 A1 *  1/2018  ............. B64C 19/00
WO     WO-2018106311 A2    6/2018

OTHER PUBLICATIONS

International Application Serial No. PCT/US2019/047847, International Search Report dated Dec. 11, 2019, 2 pgs.
(Continued)

*Primary Examiner* — Harry K Liu
(74) *Attorney, Agent, or Firm* — SCHWEGMAN LUNDBERG & WOESSNER, P.A.

(57) ABSTRACT

A vehicular simultaneous localization and mapping may fuse lidar data and pseudoranges extracted from ambient cellular LTE towers. An ICP algorithm may be used to extract odometry measurements from successive lidar scans. A robust and computationally efficient feature extraction method may be used to detect edge lines and feature points from the lidars point cloud. Then, a point registration technique using a maximum likelihood approach allows the estimation of the covariance of the odometry error, which is used in EKF propagation. The proposed approach consists of a mapping mode when GNSS signals are available and subsequently a SLAM mode when GNSS signals become unavailable. The cellular transmitters states, namely position (Continued)

and clock bias and clock drift, are continuously estimated in both modes. Simulation and experimental results validate the accuracy of these systems and methods, and provides lane-level localization without GNSS signals.

18 Claims, 17 Drawing Sheets

(51) Int. Cl.
  *G01C 21/18* (2006.01)
  *G01S 17/89* (2020.01)
(58) Field of Classification Search
  USPC .................................................... 342/357.31
  See application file for complete search history.

(56) References Cited

U.S. PATENT DOCUMENTS

| 10,212,687 | B2* | 2/2019 | Kennedy | G01C 5/06 |
| 11,366,236 | B2* | 6/2022 | Kassas | G01S 19/47 |
| 11,709,273 | B2* | 7/2023 | Kocer | G01S 19/10 |
| | | | | 342/357.29 |
| 2016/0011318 | A1 | 1/2016 | Cohen | |
| 2016/0014713 | A1 | 1/2016 | Kennedy et al. | |
| 2017/0016740 | A1 | 1/2017 | Cui et al. | |
| 2018/0231385 | A1 | 8/2018 | Fourie et al. | |

OTHER PUBLICATIONS

International Application Serial No. PCT/US2019/047847, Written Opinion dated Dec. 11, 2019, 6 pgs.

Benhabiles, et al., "Fast simplification with sharp feature preserving for 3D point clouds", 11th International Symposium on Programming and Systems (ISPS), <http://ieeexplore.ieee.org/stamp/stamp.jsp?tp=&arnumber=65814928,isnumber=6581470>, (2013), 6 pgs.

Kassas, Zaher, et al., "Adaptive Estimation of Signals of Opportunity", Radionavigation Laboratory Conference Proceedings (ION GNSS+), (Sep. 2014), 11 pgs.

Khalife, Joe, et al., "Pose Estimation with Lidar Odometry and Cellular Pseudoranges", IEEE Intelligent Vehicles Symposium (IV), (Jun. 2017), 6 pgs.

Shamaei, Kimia, et al., "LTE receiver design and multipath analysis for navigation in urban environments", Navigation, 65(4), (2018), 655-675.

International Application Serial No. PCT/US2019/047847, International Preliminary Report on Patentability dated Mar. 4, 2021, 8 pgs.

* cited by examiner

LANE-LEVEL NAVIGATION SYSTEM FOR GROUND VEHICLES WITH LIDAR AND CELLULAR SIGNALS

RELATED APPLICATION AND PRIORITY CLAIM

This application is a U.S. National State Filing under 35 U.S.C. 371 from international Application No. PCT/US2019/047847, filed on Aug. 23, 2019, and published as WO 2020/041668 A1 on Feb. 27, 2020, which is related and claims priority to U.S. Provisional Application No. 62/721,967, filed on Aug. 23, 2018, entitled "LANE-LEVEL NAVIGATION SYSTEM FOR GROUND VEHICLES WITH lidar AND CELLULAR SIGNALS," the entirety of each of which is incorporated herein by reference.

STATEMENT OF GOVERNMENT SPONSORED SUPPORT

The subject matter herein was developed with Government support under Grant (or Contract) No. Grant N00014-16-1-2809, awarded by the by the Office of Naval Research, and National Science Foundation award No. 1566240. The Government has certain rights to the subject matter herein.

BACKGROUND

Light detection and ranging (lidar) sensors are becoming prevalent in advanced driver-assistance systems (ADAS) and around vehicles. ADAS may rely on global navigation satellite systems (GNSS) and inertial measurement units (IMUs) for navigation and employ lidar sensors to sense the surrounding environment. In addition to being effective for environment mapping, lidar sensors are also effective for improving the vehicle localization accuracy due to their wide horizontal field of view, long range, and accurate measurements.

While lidar measurements provide an accurate short-term odometry and mapping solution, one cannot rely on these measurements as a standalone, accurate solution for long-term navigation. This is due to two shortcomings. First, if the lidar sensor is continuously moving, range measurements will be received at different times, leading to distortion in the captured point clouds, which in turn degrades the navigation solution. Second, since lidars are dead-reckoning (DR)-type sensors, they suffer from accumulated pose estimation error over time. Thus, in long-term driving, a lidar sensor may become unreliable and an aiding source is needed to correct the drift and improve the navigation solution.

DESCRIPTION OF EMBODIMENTS

Figure 1:
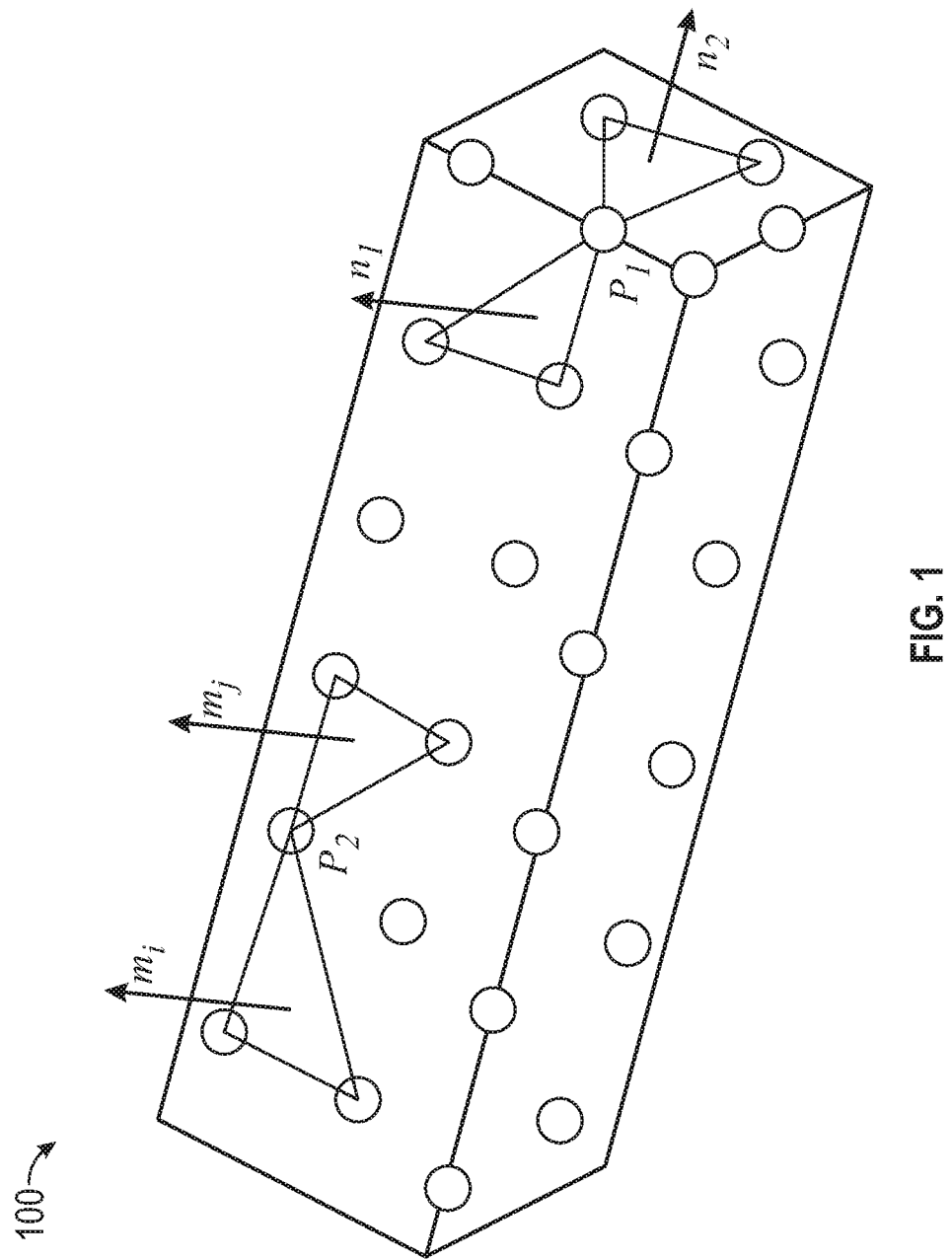
FIG. 1 is a diagram of lidar odometry feature point extraction, in accordance with at least one embodiment.

The systems and methods described herein provide technical solutions for achieving lane-level localization in global navigation satellite system (GNSS)-challenged environments. These systems and methods may use pseudoranges drawn from unknown ambient cellular towers as an exclusive aiding source for a vehicle-mounted light detection and ranging (lidar) sensor. The following scenario is considered. A vehicle aiding its lidar with GNSS signals enters an environment where these signals become unusable. The vehicle is equipped with a receiver capable of producing pseudoranges to unknown cellular towers in its environment. These pseudoranges are fused through an extended Kalman filter to aid the lidar odometry, while estimating the vehicle's own state (e.g., 3-D position and orientation) simultaneously with the position of the cellular towers and the difference between the receiver's and cellular towers' clock error states (e.g., bias and drift). These systems and methods are computationally efficient and may provide lane-level accuracy in different environments. Simulation and experimental results illustrate a close match between the vehicle's true trajectory and estimated trajectory using the cellular-aided lidar odometry over a 1 km trajectory. In an example, these systems and methods may yield at least a 68% reduction in the 2-D position root mean-squared error (RMSE) over lidar-only odometry.

A vision-based relative localization approach may fuse RGB-depth camera and lidar, where an adaptive color-based particle filter and an interacting multiple mode estimator may be used to produce two-dimensional (2-D) position estimates. A framework may augment visual odometry with lidar measurement, where the depth information extracted from lidar measurements is utilized as a bundle adjustment that refines the camera motion estimates in a batch optimization. While these approaches may reduce a lidar point cloud distortion and be used to detect visual features, the accuracy of visual cameras deteriorates in poor lighting conditions and the methods are not useful in environments lacking sufficient structured features.

Three-dimensional (3-D) vehicle position estimation may be improved by fusing data from a 2-D lidar and an inertial navigation system (INS). A closed-form formula may be used to predict a line measurement in the lidar's frame, and an extended Kalman filter (EKF) may be used to fuse the lidar and INS data.

Lidar data may be fused with GNSS signals to correct for drift in the lidar's navigation solution. An efficient construction of urban scenes may be generated from lidar data, such as by fusing a lidar point cloud and differential global positioning system (GPS) measurements. A lidar sensor may be used with a differential GPS receiver whose internal clock has been synchronized. The lidar translation vector may be calculated from the GPS solution, and the 3-D rotation may be computed by matching planes extracted from consecutive lidar point clouds.

While GNSS provides an accurate position estimate with respect to a global frame, its signals are severely attenuated in deep urban canyons, making them unreliable to aid the lidar's navigation solution. To address these GNSS drawbacks, ambient signals of opportunity (SOOPs) may be used, such as digital television signals, cellular signals, AM/FM radio signals, and other signals. SOOPs are abundant in urban canyons and are free to use. SOOPs could be exploited to produce a navigation solution in a standalone fashion, to aid an INS, and to improve the accuracy of the GNSS navigation solution.

Among the different types of SOOPs, cellular signals are particularly attractive due to several reasons. Cellular towers are arranged in a favorable geometric configuration, which yields a navigation solution with low dilution of precision factors. Cellular signals are received at significantly higher carrier-to-noise ratio than LASS signals (e.g., 15-25 dB higher). The bandwidth of cellular signals is comparable to GPS C/A signals and recent cellular generations, specifically long-term evolution (LTE), have a bandwidth up to twenty times higher than that of GPS, which yields better suppression of multipath effects.

The systems and methods described herein may be implemented using a vehicle that is equipped with a GNSS receiver, a lidar sensor, and a receiver capable of producing pseudoranges to multiple unknown cellular towers. The vehicle uses GNSS signals for navigation when available, however GNSS signals may become unusable along the vehicle's trajectory, such as in deep urban canyons. In the absence of GNSS signals, DR-type sensors (e.g., IMUs, vision sensors) can be used to improve the navigation solution. However, the navigation solution errors of DR sensors accumulate over time due to integrating noisy measurements. A high quality IMUs may provide reduced errors, however the cost of an IMU increases exponentially with its quality. Moreover, while the accuracy of visual odometry improves when more features are processed, this comes at significant increase in computational burden. Therefore, achieving a good navigation performance with such sensors is significantly costly, both financially and computationally.

SOOPs may be used for navigation, which are free to use and are available in situations where GNSS signals are inaccessible or unreliable. Two modes of operation may be used based on availability of GNSS signals. When GNSS signals are available, a specialized cellular receiver may make pseudorange measurements to nearby cellular towers to map these transmitters, such as to estimate the towers' position and the difference between the receiver's and cellular transmitters' clock bias and drift. When GNSS signals become unusable, the pseudoranges drawn from the mapped cellular transmitters are used exclusively as an aiding source to correct the error due to lidar odometry. An EKF-based framework may be adopted that operates in a mapping mode when GNSS signals are available, and operates in a radio simultaneous localization and mapping (SLAM) mode when GNSS signals are unusable. It is worth noting that while these systems and methods are described with respect to cellular LTE signals, the developed techniques are applicable to pseudorange measurements made to other SOOPs.

An iterative closest point (ICP) algorithm may be used to solve for the relative pose between lidar scans. This algorithm may use 0.5% of the nearly 90,000 3-D points in every laser scans, which may provide a 3-D position root mean-squared error (RAISE) of 29.6 m and a 2-D RMSE of 9.61 m over a 1 km trajectory using three cellular code-division multiple access (CDMA) towers. However, those results were based on a system that assumed the position of the cellular towers to be fully known.

The systems and methods described herein provide a precise and computationally efficient approach for extracting lidar odometry measurements. This uses a fast and robust feature extraction technique from lidar point clouds. This also estimates the covariance of the relative pose estimation error using a maximum likelihood estimator. The calculated covariance is used in the EKE to propagate the six-degrees of freedom (6DOF) pose estimation error covariance.

Additionally, the systems and methods described herein extend the navigation solutions to environments in which the position of the cellular towers are unknown by adapting a radio SLAM approach. The receiver's clock error states (e.g., bias, drift) as well as cellular transmitters' clock error states are dynamic and stochastic and are continuously estimated. In contrast to the traditional robotic SLAM problem whose environmental map consists of static states (e.g., landmarks, posts, trees, etc.), the radio SLAM problem is more complex due to the dynamic and stochastic nature of the radio map. An EKF-based framework is used to fuse lidar odometry measurements and SOOP pseudoranges. This simultaneously localizes the vehicle-mounted receiver and maps the cellular transmitters' environment.

The systems and methods described herein analyze the performance of the obtained model through two sets of experimental tests. In the first set, lidar and GPS data from the KITTI data sets are used and pseudoranges to cellular towers are simulated. In the second set, data is collected with a car equipped with a lidar sensor, a GPS-aided INS, and a cellular LIE receiver that produced pseudoranges to nearby unknown LTE towers. In the second set of experiments, the LTE towers were obstructed and far from the vehicle (more than 1.7 km), reducing the portions of the trajectory where the vehicle-mounted receiver had line-of-sight (LOS) to the LIE towers. Experimental results compare the trajectory estimates corresponding to a lidar odometry-only navigation solution with this cellular-aided framework. In an example, results from both experimental sets show that these systems and methods reduce the position RMSE of the lidar odometry-only estimate by at least 68%.

The systems and methods produce a navigation solution without GNSS signals or other navigation sensors (e.g., IMU) by fusing lidar data with pseudoranges from ambient SOOPs in the environment. An IMU will also experience drift in the absence of GNSS signals. Cellular pseudoranges may be used as an aiding source in a global frame in the absence of GNSS signals. If the vehicle is equipped with other navigation sensors, adding pseudoranges from cellular towers via the systems and methods discussed herein can still improve the navigation solution.

This section presents the dynamics of the cellular tower transmitters, the vehicle's kinematics models, as well as the measurement model of the lidar and vehicle-mounted receiver. The navigation environment is assumed to comprise $N_s$ cellular towers, denoted $[S_i]_{i=1}^{N_s}$. Each tower is assumed to be spatially-stationary and its state vector consists of its 3-D position states as well as the difference between its clock bias and drift with clock bias and drift of the vehicle-mounted receiver. Hence, the state of the n-th cellular tower is given by $x_{s_n} = [r_{s_n}^T, \Delta x_{clk,s_n}^T]^T$, where $r_{s_n} = [x_{s_n}, y_{s_n}, z_{s_n}]^T$ is the 3-D position vector of the n-th cellular tower and $$\Delta x_{clk,s_n} \triangleq [c\Delta \delta t_n, c\Delta \dot{\delta} t_n]^T, \quad (1)$$

where c is the speed of light, $\Delta \delta t_n$ is the difference between the n-th tower's clock bias and the receiver's clock bias, and $\Delta \dot{\delta} t_n$ is the difference between the n-th tower's clock drift and the receiver's clock drift. The dynamics of the augmented vector $$\Delta x_{clk} \triangleq \left[ \Delta x_{clk,s_1}^T, \ldots, \Delta x_{clk,s_{N_S}}^T \right]^T$$

evolve according to the discrete-time (DT) model $$\Delta x_{clk}(k+1) = \Phi_{clk} \Delta x_{clk}(k) + w_{clk}(k), \, k = 0, 1, 2, \ldots \quad (2)$$

$$\Phi_{clk} \triangleq \begin{bmatrix} F_{clk} & 0 & \ldots & 0 \\ 0 & F_{clk} & \ldots & 0 \\ \vdots & \vdots & \ddots & \vdots \\ 0 & 0 & \ldots & F_{clk} \end{bmatrix}, F_{clk} \triangleq \begin{bmatrix} 1 & T \\ 0 & 1 \end{bmatrix},$$

where k is the measurement time-step, T is the sampling time, and $w_{clk}$ is the process noise, which is modeled as a DT zero-mean white random sequence with covariance $$Q_{clk} = \Gamma Q_{clk,r,s} \Gamma^T, \quad (3)$$

where $$\Gamma \triangleq \begin{bmatrix} I_{2\times 2} & -I_{2\times 2} & 0 & \ldots & 0 \\ I_{2\times 2} & 0 & -I_{2\times 2} & \ldots & 0 \\ \vdots & \vdots & \vdots & \ddots & \vdots \\ I_{2\times 2} & 0 & 0 & \ldots & -I_{2\times 2} \end{bmatrix},$$

and $$Q_{clk,r,s} \triangleq \text{diag}[Q_{clk,r}, Q_{clk,s_1}, \ldots, Q_{clk,s_{N_S}}].$$

Here, $Q_{clk,s_n}$ is the process noise covariance of the n-th cellular tower's clock states, which is given by $$Q_{clk,s_n} = c^2 \begin{bmatrix} S_{\tilde{\omega}_{\delta t,s_n}} T + S_{\tilde{\omega}_{\dot{\delta} t,s_n}} \frac{T^3}{3} & S_{\tilde{\omega}_{\dot{\delta} t,s_n}} \frac{T^2}{2} \\ S_{\tilde{\omega}_{\dot{\delta} t,s_n}} \frac{T^2}{2} & S_{\tilde{\omega}_{\dot{\delta} t,s_n}} T \end{bmatrix},$$

where $S_{\tilde{\omega}_{\delta t,s_n}}$ and $S_{\tilde{\omega}_{\dot{\delta} t,s_n}}$ are the power spectra of the continuous-time (CT) process noise $\tilde{\omega}_{\delta t,s_n}$ and $\tilde{\omega}_{\dot{\delta} t,s_n}$, driving the clock bias and clock drift, respectively. Note that $Q_{clk,r}$ has the same form as $Q_{clk,s_n}$, except that $S_{\tilde{\omega}_{\delta t,s_n}}$ and $S_{\tilde{\omega}_{\dot{\delta} t,s_n}}$ are now replaced by the receiver-specific spectra $S_{\tilde{\omega}_{\delta t,r}}$ and $S_{\tilde{\omega}_{\dot{\delta} t,r}}$, respectively.

Since the cellular transmitters are assumed to be spatially-stationary, their position states evolve according to the DT dynamics $$r_s(k+1) = r_s(k), \quad (4)$$

where $$r_s = \left[ r_{s_1}^T, \ldots, r_{s_{N_S}}^T \right]^T.$$

The vehicle may be equipped with lidar for odometry, such as a receiver capable of producing pseudorange measurements to cellular towers. The vehicle may also be equipped with a GPS receiver. The vehicle's state vector $x_r$ consists of the vehicle's pose: position $r_r$ and orientation $_B^G q$, i.e., $x_r \triangleq [_B^G q^T, r_r^T]^T$, where $_B^G q$ is the 4-D unit quaternion in vector-scalar dorm and represents the orientation of the vehicle body frame B with respect to the orienal frame G which is the Earth-centered Earth-fixed (ECEF) coordinate frame. The vector $r_r = [x_r, y_r, z_r]^T$ represents the 3-D position of the vehicle body expressed in the global frame G. The change in vehicle's states can be estimated over time using data from the lidar sensor. For this purpose, two successive lidar frames captured at time-steps k and k+1 are compared. Then, the change in position $^{B_k}r_{B_{k+1}}$ and the change in orientation $_{B_{k+1}}^{B_k} q$ of the vehicle's body frame is estimated from time-step k to time-step k+1. In other words, $_{B_{k+1}}^{B_k} q$ represents the relative rotation of the vehicle body frame from time-step k to k+1 and $^{B_k}r_{B_{k+1}}$ denotes the position of me vehicle at time k+1 expressed in the vehicle body frame at time k. Hence, the orientation of the vehicle will evolve in DT according to the kinematic model given by $$_{B_{k+1}}^G q = \otimes_{B_{k+1}}^{B_k} q, \quad (5)$$

where $_{B_k}^G q$ represents the orientation of the vehicle body frame in the global frame at time k and $\otimes$ is the quaternion multiplication operator. The vehicle's position evolves according to the kinematic model given by $$r_r(k+1) = r_r(k) + R[_{B_k}^G q]^{B_k} r_{B_{k+1}}, \quad (6)$$

where R[q] is the 3-D rotation matrix constructed from the 4-D quaternion vector q. For a sample quaternion $q = [_{p_4}^P] = [p_1, p_2, p_3, p_4]^T$, the relationship between q and R[q] is given by $R[q] = (2p_4^2) I_{3\times 3} - 2p_4 \lfloor p \times \rfloor + 2pp^T$, where $\lfloor p \times \rfloor$ is the skew-symmetric matrix operator, defined as $$\lfloor p \times \rfloor \triangleq \begin{bmatrix} 0 & -p_3 & p_2 \\ p_3 & 0 & -p_1 \\ -p_2 & p_1 & 0 \end{bmatrix}.$$

After discretization and mild approximations, the pseudoranges made by the vehicle-mounted receiver on the n-th cellular tower are given by $$z_{s_n}(k) = \|r_r(k) - r_{s_n}(k)\|_2 + c\Delta\delta t_n(k) + v_{s_n}, \quad (7)$$

where $v_{s_n}$ is the measurement noise, which is modeled as a DT zero-mean white Gaussian sequence with variance $\sigma_{s_n}^2$. Subsequently, the vector of pseudorange measurements to all $N_s$ cellular tower transmitters is given by $$z_s = [z_{s_1}, \ldots, z_{s_{N_s}}]^T. \quad (8)$$

Each lidar scan may consist of relative position measurements to L points in the environment. The relative position measurement to the i-th point can be expressed as $$z_{l_i}(k) = {}^{B_k}r_{l_i} + v_{l_i}(k), i=1, \ldots, L, \quad (9)$$

where ${}^{B_k}r_{l_i}$ is the 3-D position of the i-th point expressed in the vehicle body frame at time-step k and $v_{l_i}$ is the measurement noise, which is modeled as a zero-mean Gaussian random vector with $\mathbb{E}[v_{l_i}(k)v_{l_i}^T(k')] = C_{l_i}\delta_{kk'}$, where $\delta_{kk'}$ is the Kronecker delta function.

FIG. 1 is a diagram of lidar odometry feature point extraction 100, in accordance with at least one embodiment. Odometry measurements may be produced from lidar data using an iterative closest point algorithm. The goal is to compare two successive point clouds captured by the lidar sensor from which to calculate the relative position ${}^{B_k}r_{B_{k+1}}$ and relative orientation ${}_{B_{k+1}}^{B_k}q$ of the vehicle between the lidar scan at time-step k and time-step k+1. An ICP algorithm may be used for geometric alignment of 3-D point clouds, such as for geometric alignment between two partially overlapped but misaligned data sets. This ICP algorithm involves three main steps: (1) detecting feature points and eliminating remaining points, (2) finding corresponding points between two successive scans, and (3) registering the corresponding points and calculating relative rotation and translation. In order to achieve real-time performance, the total number of points in each point cloud returned by the lidar sensor must be reduced. Moreover, since large planar areas degrade the ICP solution, the solution is improved by extracting strategic feature points, namely sharp edges.

As can be seen in FIG. 1, $P_i$ may be a point in a sample point cloud, and $P_i$ may have nearest neighbors. Hence, there are $\varphi(\varphi-1)/2$ possible triangles with $P_i$ and two neighboring points as vertices, and there are $\varphi(\varphi-1)/2$ unit normal vectors to these triangles. In sharp edges, the unit normal vectors have different directions, as can be seen in FIG. 1. In particular, the circles may be scanned points of the surface of the object. The point $P_1$ may belong to a sharp edge because two unequal normal vectors at $n_1$ and $n_2$ are found in its neighborhood. In contrast, $P_2$ is not on a sharp edge because all normal vectors in its neighborhood are equal. The normal vectors are used for feature identification. Since $n_1 \neq n_2$, then $P_1$ belongs to a sharp edge, while for all i and j in the neighborhood of $P_2$, $m_i = m_j$, hence $P_2$ is not on a sharp edge.

Evaluating normal vectors to neighboring points is an efficient technique for extracting sharp edges. However, searching for the nearest neighbor is a time consuming step in ICP. An alternative technique may be used for accelerating the search for the nearest neighbor in point clouds captured by the lidar sensor. The points returned by the lidar sensor are stored in different layers. A layer is defined as a group of points with the same height from the ground surface. Here, it is assumed that the lidar is calibrated and mounted in parallel with the ground surface. The top layer has the maximum height with respect to the ground and the bottom layer has the minimum height with respect to the ground. In order to approximate the number of points in each layer, it is assumed that the lidar sensor produces P points in each 360° scan. If the vertical field of view of the lidar is $\alpha_{min}$ to $\alpha_{max}$ degrees, and the angular resolution of scans is $\beta$ degrees, then the number of points in each layer $N_l$ can be approximated to be $\mathcal{N}_l \approx \mathcal{P} \times \beta/(\alpha_{max}, \alpha_{min})$.

Figure 2:
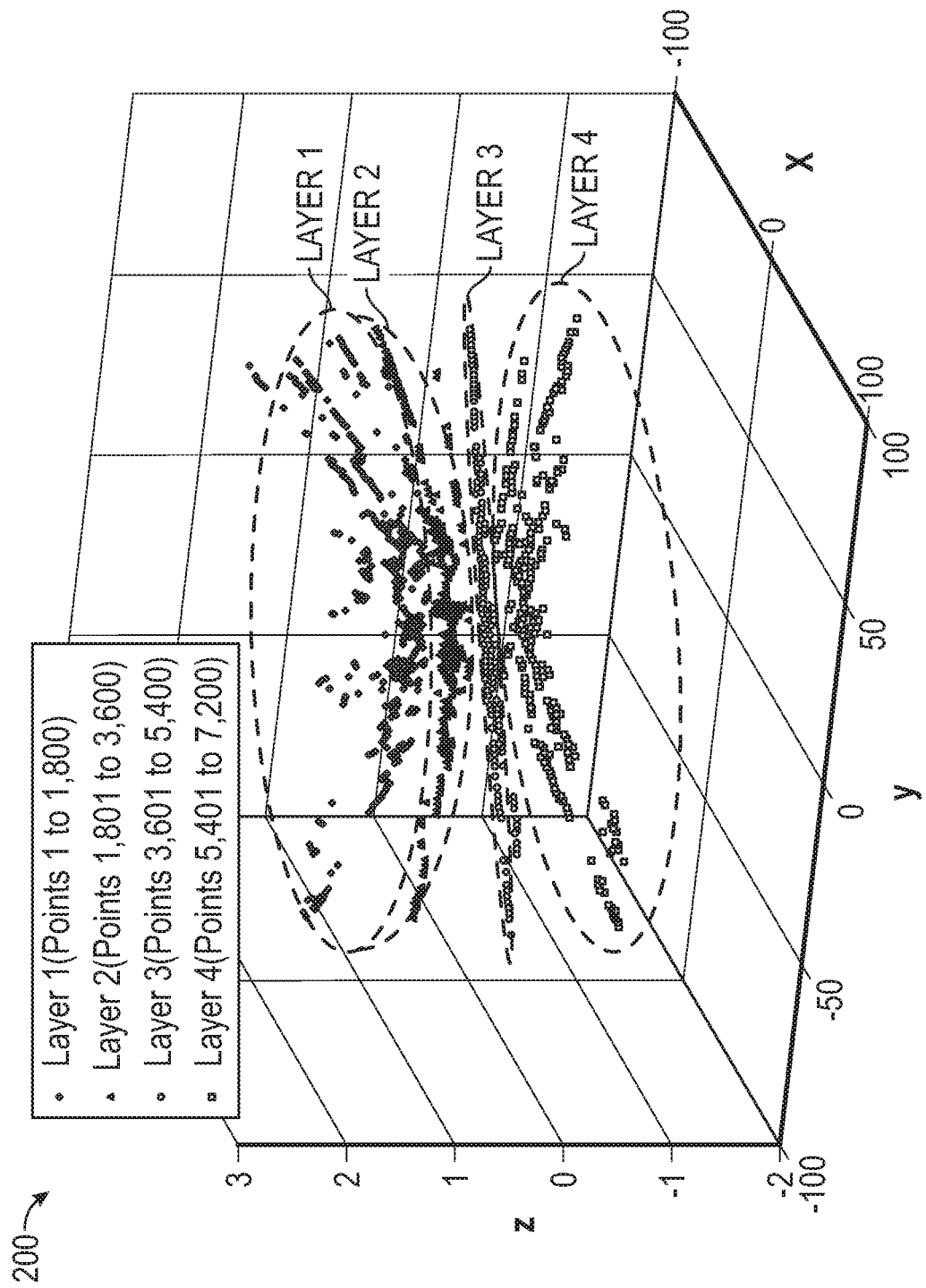
FIG. 2 is a diagram of a point cloud, in accordance with at least one embodiment.

FIG. 2 is a diagram of a point cloud 200, in accordance with at least one embodiment. In an example, point cloud 200 shows points that may be returned by a Velodyne HDL-64E lidar. In the data shown in FIG. 2 there are 1,800 points in each layer. The points returned by the lidar sensor are not stored randomly. The returned points are stored according to the lidar's electrical and mechanical scanning steps. The lidar sensor shines a light to scan a surface, then it rotates vertically to scan another new surface. Before each rotation, the returned points from the previous scan are stored in a buffer sequentially. Subsequently, the neighboring points of $P_i$ are limited only to the candidate points whose height or side distance are shorter than a specified threshold with respect to $P_i$, i.e., $P_j$ is a neighbor candidate of $P_i$ if and only if $|i-j+\kappa \times \mathcal{N}_l| < \eta$, where $\kappa$ and lidar layer filter threshold $\eta$ are signed and unsigned integers, respectively. For $\kappa=0$, $P_i$ and $P_j$ belong to the same layer. For $\kappa=-1$, $P_j$ belongs to an upper layer with respect to $P_i$, and for $\kappa=1$, $P_j$ belongs to a lower layer with respect to $P_i$. Experimental results show that $\kappa \in \{-3, -2, -1, 0, 1, 2, 3\}$ and $\eta = 10$ is a search space large enough to achieve acceptable precision. This solution avoids searching unnecessary points. Candidate points may be chosen based on their indices, which may reduce or eliminate the need for computing distances. For the lidar used herein, 90,000 points are returned in each scan and only 40 candidate points are evaluated.

Corresponding points may be found between two successive scans, such as by using a mutual consistency check. Given two sets of scans $P_k$ and $P_{k+1}$, and two points $p_i^k \in \mathcal{P}^k$ and $p_i^{k+1} \in \mathcal{P}^{k+1}$, then $p_i^k$ and $p_i^{k+1}$ are corresponding points if:

$$\underset{p_j^k \in \mathcal{P}^k}{\operatorname{argmin}} \|p_{i'}^{k+1} - (\mathcal{R}p_j^k + \mathcal{T})\| = p_i^k,$$

and $$\underset{p_j^{k+1} \in \mathcal{P}^{k+1}}{\operatorname{argmin}} \|p_i^k - [\mathcal{R}^T(p_j^{k+1} - \mathcal{T})]\| = p_{i'}^{k+1},$$

where R is the rotation matrix and T is the translation vector obtained from the last odometry measurement in which $P_{k-1}$ and $P_k$ were processed. Due to the large mass and inertia of the vehicle, R and T do not change significantly from time-step k to k+1. This causes fast convergence of the ICP algorithm, such as can be seen in the simulation and experimental results discussed further below.

In the point registration step, the algorithm estimates the relative change in the vehicle position ${}^{B_k}r_{B_{k+1}}$ and orientation ${}_{B_{k+1}}^{B_k}q$. This is achieved by solving for the transformation (rotation and translation) between two lidar point clouds. There are several methods to perform point registration. A maximum likelihood approach may be used for registering the points. The relative change in position and orientation of the vehicle may be estimated iteratively using the Gauss-Newton method, until the estimates converge. The estimates are updated after each iteration according to $$^{B_k}\hat{r}_{B_{k+1}}^{(t+1)} = {}^{B_k}\hat{r}_{B_{k+1}}^{(t)} + {}^{B_k}\tilde{r}_{B_{k+1}}^{(t)},$$

$$^{B_k}_{B_{k+1}}\hat{q}^{(t+1)} = {}^{B_k}_{B_{k+1}}\hat{q}^{(t)} \otimes {}^{B_k}_{B_{k+1}}\hat{q}^{(t)},$$

where $$^{B_k}_{B_{k+1}}\tilde{q}^{(t)} \triangleq \left[ \frac{1}{2}\left(\tilde{\theta}_l^{(t)}\right)^T, \sqrt{1 - \frac{1}{4}\left(\tilde{\theta}_l^{(t)}\right)^T \tilde{\theta}_l^{(t)}} \right]^T,$$

$\tilde{\theta}_l^{(t)}$ and $^{B_k}\tilde{r}_{B_{k+1}}^{(t)}$ are the corrections computed at iteration t according to $$\begin{bmatrix} \tilde{\theta}_l^{(t)} \\ {}^{B_k}\tilde{r}_{B_{k+1}}^{(t)} \end{bmatrix} = Q_l^{(t)} \left[ \sum_{i=1}^{N_p} \left(H_{l_i}^{(t)}\right)^T \left(C_{n_i}^{(t)}(k)\right)^{-1} v_{l_i}(k) \right],$$

$$Q_l^{(t)} = \left[ \sum_{i=1}^{N_p} \left(H_{l_i}^{(t)}\right)^T \left(C_{n_i}^{(t)}(k)\right)^{-1} H_{l_i}^{(t)} \right]^{-1},$$

$$H_{l_i}^{(t)} = \left[ -\left\lfloor R\begin{bmatrix} B_k \\ B_{k+1} \end{bmatrix} \hat{q}^{(t)} \right\rfloor z_{l_i}(k+1) \times \right] I \right],$$

$$C_{n_i}(k) = C_{l_i} + R\begin{bmatrix} B_k \\ B_{k+1} \end{bmatrix} \hat{q} \Big] C_{l_i} R\begin{bmatrix} B_k \\ B_{k+1} \end{bmatrix} \hat{q} \Big]^T,$$

where $z_{l_i}(k)$ and $C_{l_i}$ are obtained. After convergence, an estimate $\hat{x}_l = [{}_{B_{k+1}}^{B_k}\hat{q}^T, {}^{B_k}\hat{r}_{B_{k+1}}^T]^T$ is obtained. The resulting estimation error $\tilde{x}_l = [\tilde{\theta}_l^T, {}^{B_k}\tilde{r}_{B_{k+1}}^T]^T$ is zero-mean and has a covariance $Q_l$. The covariance of the relative pose estimation error is estimated. This will be useful when propagating the covariance of the absolute pose estimation error in the EKF.

Figure 3:
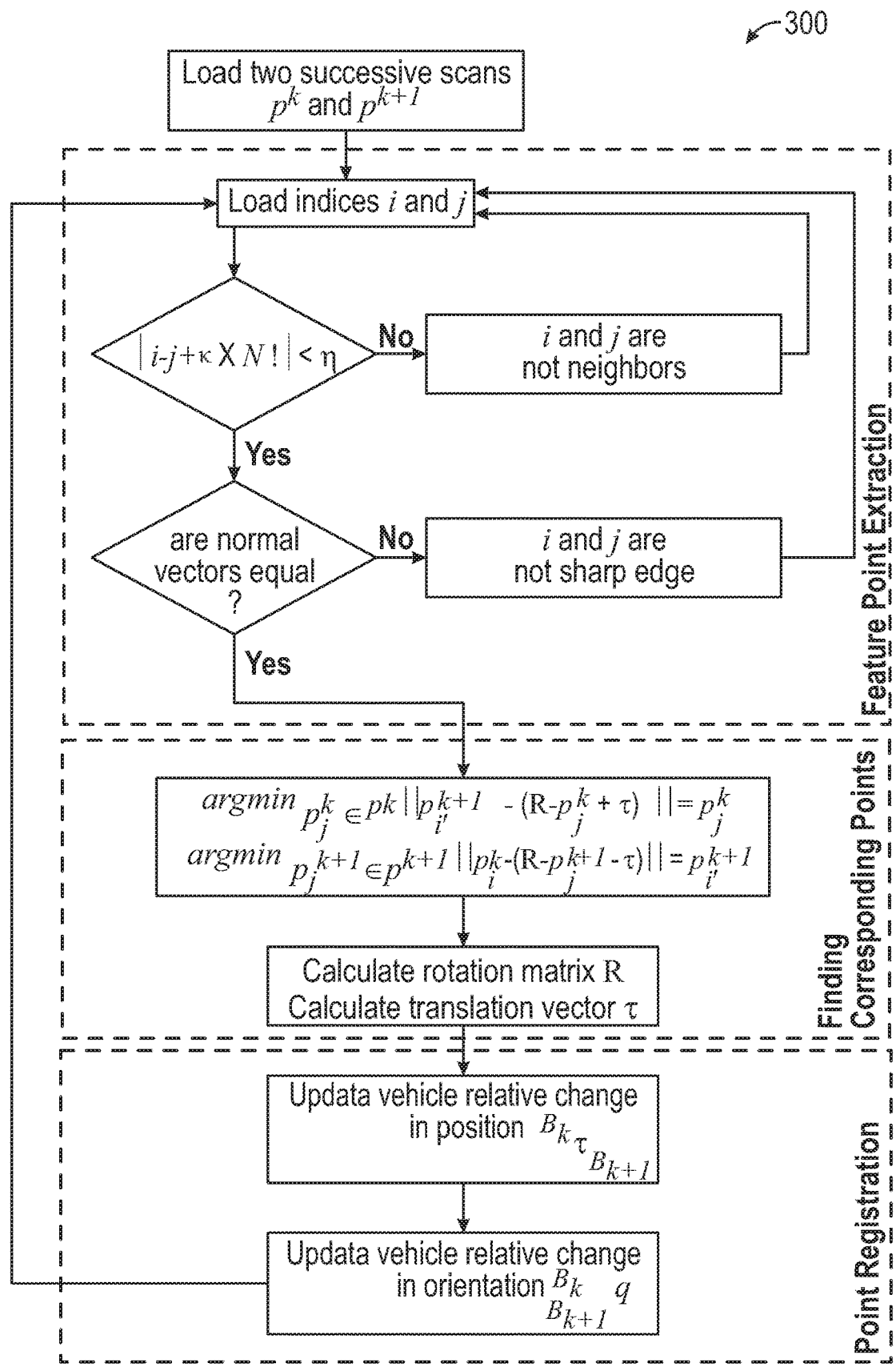
FIG. 3 is a flow chart showing odometry measurement extraction, in accordance with at least one embodiment.

FIG. 3 is a flow chart showing odometry measurement extraction 300, in accordance with at least one embodiment. In particular, FIG. 3 summarizes the steps of the proposed computationally efficient odometry measurement extraction method described above. Odometry measurement extraction 300 may be divided into three parts: feature point extraction, finding corresponding points, and point registration.

Figure 4:
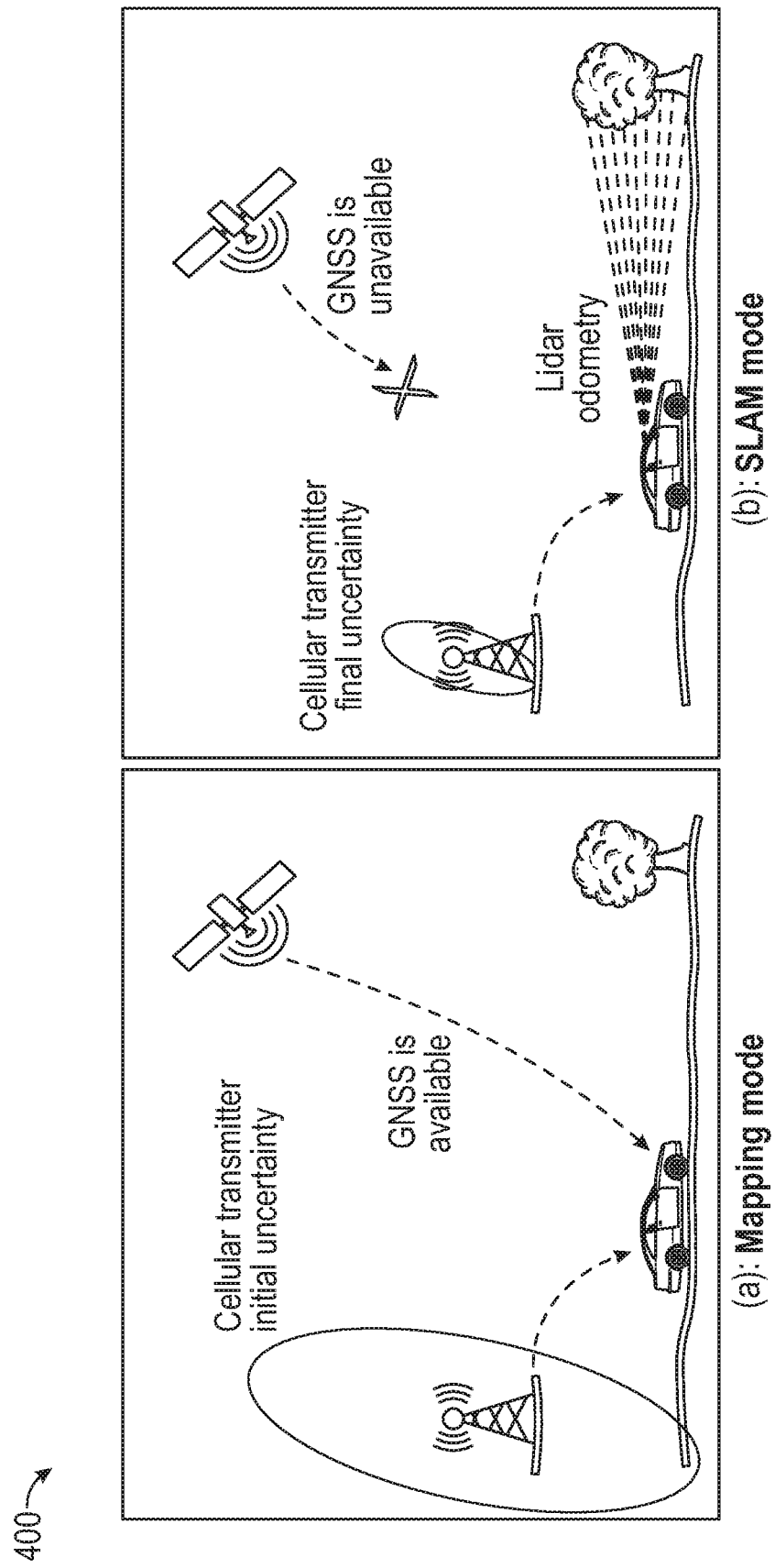
FIG. 4 is a diagram of a mapping and SLAM modes, in accordance with at least one embodiment.

FIG. 4 is a diagram of a mapping and SLAM modes 400, in accordance with at least one embodiment. 3-D position information is extracted from pseudorange measurements from unknown cellular towers. A vehicle is assumed to navigate in an environment comprising $N_s$ cellular transmitters. The states of these transmitters are assumed to be unknown. When GNSS signals are available, the vehicle could estimate its own states and starts mapping the cellular transmitters' states, such as by estimating their position and clock bias and drift from the pseudorange measurements produced by the receiver. When GNSS signals become unavailable, the vehicle enters the SLAM mode. Here, the vehicle uses lidar for odometry, continues mapping the cellular transmitters' states, and simultaneously localizes itself by estimating its own position and orientation.

The cellular towers are analogous to the landmarks in the SLAM problem, with the added complexity of estimating the dynamic and stochastic clock error states of each cellular tower. To tackle this problem, an EKF-based solution is adopted that operates in (1) a mapping mode when GNSS signals are available and (2) a SLAM mode when the GNSS signals are unavailable. This mapping and SLAM modes 400 is illustrated in FIG. 4. The following subsections detail the operations of each mode. In mapping mode, a vehicle state is determined based on available GNSS signals. The vehicle fuses pseudoranges made on the cellular transmitter to map the transmitters' state. In SLAM mode, GNSS signals are unavailable. Here, the vehicle maps the cellular transmitter states, simultaneously with localizing itself, while using pseudorange measurements from the mapped cellular towers as aiding source to correct the lidar's accumulated errors.

Figure 5:
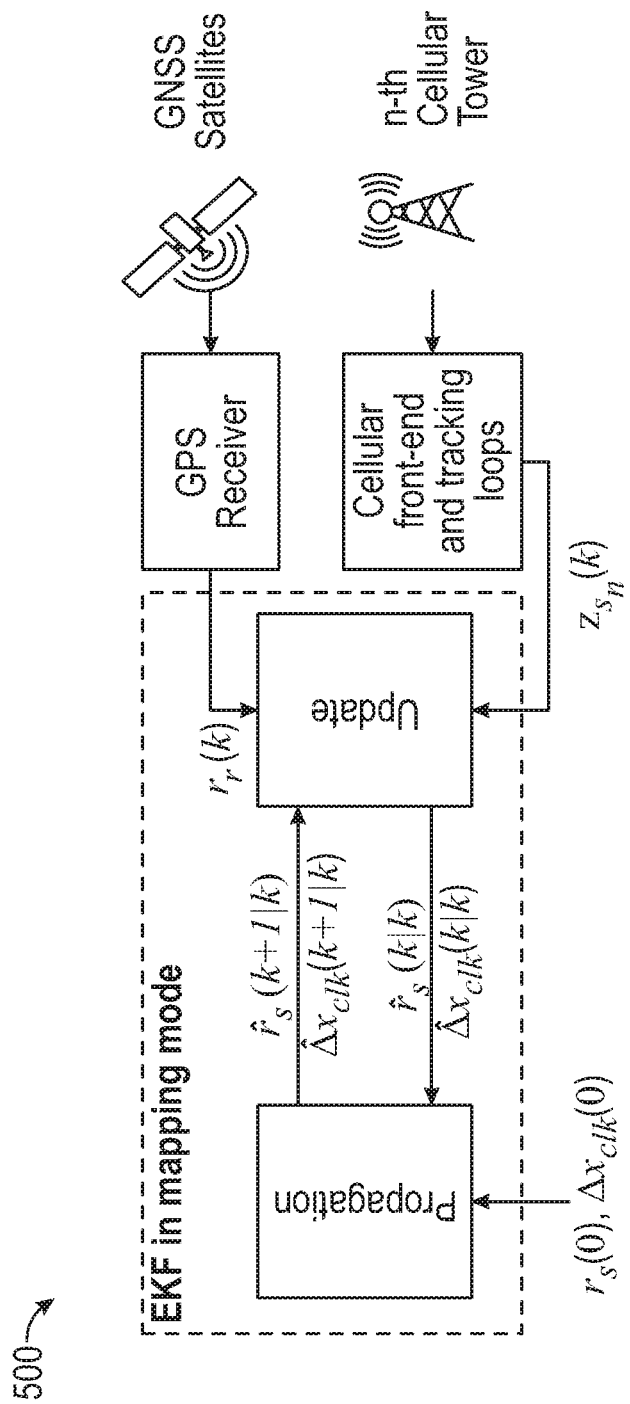
FIG. 5 is a diagram of a mapping mode, in accordance with at least one embodiment.

FIG. 5 is a diagram of a mapping mode 500, in accordance with at least one embodiment. Mapping mode 500 includes generating an EKF solution. In mapping mode 500, the vehicle-mounted receiver has access to GNSS, from which it could estimate its position state $r_r$. The EKF state vector x comprises the cellular tower locations and the difference between the receiver's and cellular transmitters' clock bias and drift, namely $$x = \left[ r_{s_1}^T, \ldots, r_{s_{N_s}}^T, \Delta x_{clk,s_1}^T, \ldots, \Delta x_{clk,s_{N_s}}^T \right]^T. \quad (10)$$

The estimation solution in the snapping mode is illustrated in FIG. 5.

The dynamics discussed herein are used to calculate the predicted state estimate $\hat{x}(k+1|k)$ and associated prediction error covariance $P(k+1|k)$ according to $$\hat{x}(k+1|k) = F\hat{x}(k|k)$$

$$P(k+1|k) = FP(k|k)F^T + \begin{bmatrix} 0_{3N_s \times 3N_s} & 0 \\ 0 & Q_{clk} \end{bmatrix},$$

where $$F = \begin{bmatrix} I_{3N_s \times 3N_s} & 0 \\ 0 & \Phi_{clk} \end{bmatrix}.$$

Given the vehicle's position $r_r(k+1)$ from the GNSS receiver, the measurement prediction $\hat{z}_{s_n}(k+1|k)$ can be computed as $$\hat{z}_{s_n}(k+1|k) = \|r_r(k+1) - \hat{r}_{s_n}(k+1|k)\|_2 +$$

$$c\hat{\Delta}\delta t_n(k+1|k), n=1,\ldots,N_s \quad (11)$$

Given cellular pseudorange measurements $z_s(k+1)$ the innovation $v_s(k+1)$ is computed as $$v_s(k+1) = z_s(k+1) - \hat{z}_s(k+1|k),$$

where $$\hat{z}_s(k+1|k) \triangleq \left[ \hat{z}_{s_1}(k+1|k), \ldots, \hat{z}_{s_{N_s}}(k+1|k) \right]^T.$$

The corresponding measurement Jacobian $$H(k+1) \triangleq \frac{\partial z_s(k+1)}{\partial x(k+1)}$$

is given by $$H(k+1) = [H_{r_s} H_{clk}],$$

where $$H_{r_s} = \text{diag}\left[1_{s_1}^T, \ldots, 1_{s_{N_s}}^T\right],$$

$$1_{s_n} = \frac{\hat{r}_{s_n}(k+1|k) - r_r(k+1)}{\left\|\hat{r}_{s_n}(k+1|k) - r_r(k+1)\right\|_2},$$

and $$H_{clk} = \text{diag}\left[h_{clk,s_1}, \ldots, h_{clk,s_{N_s}}\right], h_{clk,s_n} = [1 \quad 0].$$

Note that $1_{s_n}$ is the unit line-of-sight vector between the receiver and the n-th cellular transmitter, expressed in the ECEF coordinate frame. The Kalman gain $K(k+1)$ is computed according to $$K(k+1) = P(k+1|k)H(k+1)^T S(k+1)^T S(k+1)^{-1},$$

where $S(k+1) = H(k+1)P(k+1|k)H(k+1)^T + \Sigma_s$ is the innovation covariance and $$\Sigma_s = \text{diag}\left[\sigma_{s_1}^2, \ldots, \sigma_{s_{N_s}}^2\right]$$

is the measurement noise covariance.

The cellular transmitter's corrected state estimate $\hat{x}(k+1|k+1)$ and associated estimation error covariance is computed from $$\hat{x}(k+1|k+1) = \hat{x}(k+1|k) + K(k+1)v_s(k+1|k),$$

$$P(k+1|k+1) = [I - K(k+1)H(k+1)]P(k+1|k),$$

Figure 6:
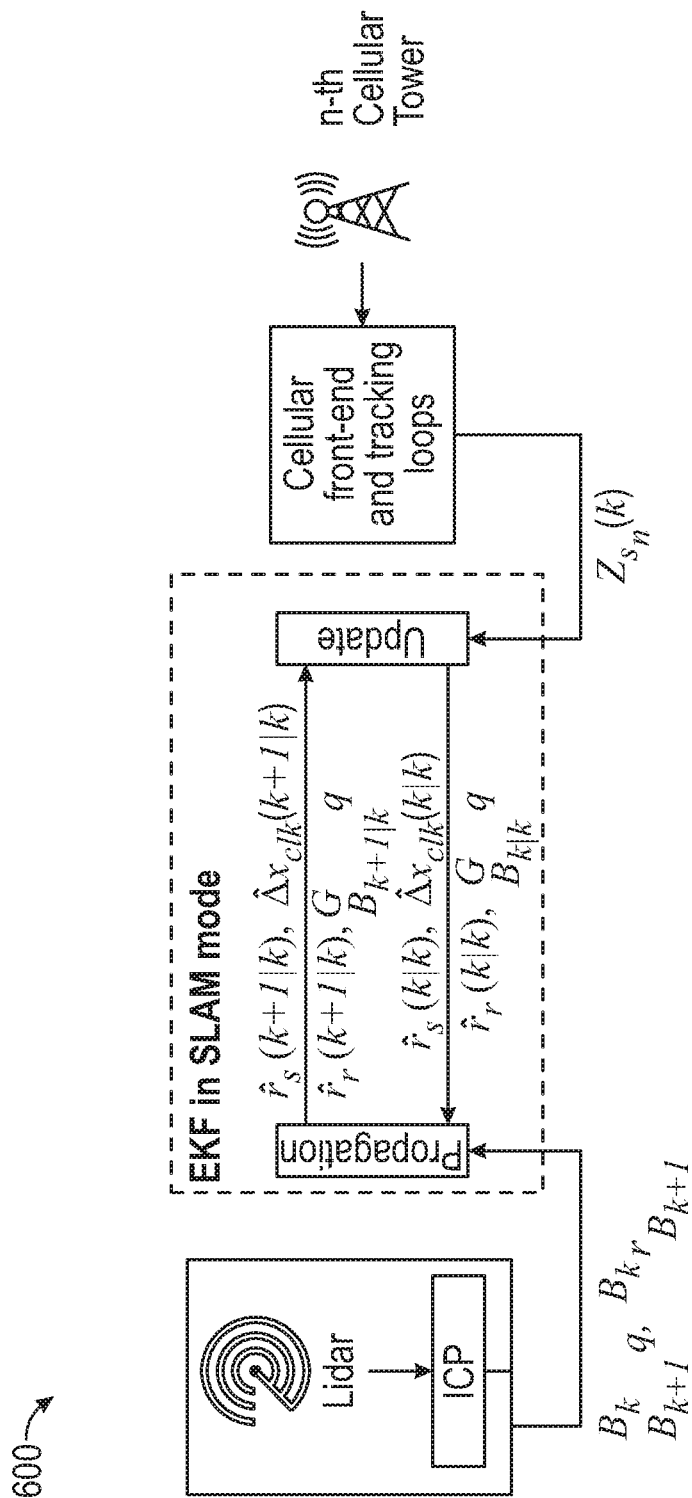
FIG. 6 is a diagram of SLAM mode, in accordance with at least one embodiment.

FIG. 6 is a diagram of SLAM mode 600, in accordance with at least one embodiment. In SLAM mode 600, the vehicle-mounted receiver has little or no access to GNSS signals. The EKF estimates the cellular towers' state simultaneously with the vehicle's own state. The estimation solution in the SLAM mode is illustrated in FIG. 6. At each time-step k, the proposed ICP algorithm produces the relative pose $^{B_k}\hat{T}_{B_{k+1}}$ and relative orientation $_{B_{k+1}}^{B_k}\hat{q}$ of the vehicle between two consecutive lidar scans, which are used to propagate the states of the receiver. Then, the pseudoranges are used to update the receiver's pose estimate as well as the cellular towers' position and clock state estimates.

In order to differentiate between the mapping and SLAM modes, the "prime" symbol is used herein to designate the variables in the SLAM mode. Therefore, "x" is now replaced with "x'". The state vector x' comprises the vehicle's pose (e.g., position, orientation), cellular towers' position, and the difference between the receiver's and the cellular transmitters' clock bias and drift, namely $$x' = \left[_B^G q^T, r_r^T, \Delta x_{clk,s_1}^T, \ldots, \Delta x_{clk,s_{N_s}}^T, r_{s_1}^T, \ldots, r_{s_{N_s}}^T\right]^T,$$

The EKF error state is defined as $$\tilde{x}' \triangleq \left[\tilde{\theta}^T, \tilde{r}_r^T, \tilde{\Delta}_{clk,s_1}^T, \ldots, \Delta x_{clk,s_{N_s}}^T, \tilde{r}_{s_1}^T, \ldots, \tilde{r}_{s_{N_s}}^T\right]^T,$$

where $\tilde{\theta}$ is the 3-axis angle error vector. Note that the quaternion representation is an over-determined representation of the orientation of a body. Hence, the estimation error covariance associated with the quaternion estimate will always be singular. To avoid singularity, the vector of angle errors $\tilde{\theta}$ is used to form the error state vector. The orientation error model follows the quaternion multiplication model given by $$_B^G q = \delta q \otimes _B^G \hat{q},$$

where $$\delta q = \left[\frac{1}{2}\tilde{\theta}^T, \sqrt{1 - \frac{1}{4}\tilde{\theta}^T\tilde{\theta}}\right]^T.$$

The position and clock errors are defined using the standard additive error model $$\tilde{r}_r = r_r - \hat{r}_r,$$

$$\hat{\Delta}x_{clk,s_n} = \Delta x_{clk,s_n} - \hat{\Delta}x_{clk,s_n}, n = 1, \ldots, N_s,$$

$$\tilde{r}_{s_n} = r_{s_n} - \hat{r}_{s_n}, n = 1, \ldots, N_s \quad (13)$$

In the SLAM mode, the propagation of the state estimate is given by $$_{B_{k+1|k}}^G \hat{q} = _{B_{k|k}}^G \hat{q} \otimes _{B_{k+1}}^{B_k} \hat{q}, \quad (14)$$

$$\hat{r}_r(k+1|k) = \hat{r}_r(k|k) + R\left[_{B_{k|k}}^G \hat{q}\right]^{B_k} \hat{r}_{r_{B_{k+1}}},$$

$$\hat{\Delta}x_{clk}(k+1|k) = \Phi_{clk}\hat{\Delta}x_{clk}(k|k),$$

$$\hat{r}_s(k+1|k) = \hat{r}_s(k|k).$$

In order to obtain the propagation equation for the estimation error covariance, the linearized error dynamics are first derived. The orientation propagation equation may be expressed as $$R[_{B_{k+1}}^G q] = R[_{B_k}^G q]R[_{B_{k+1}}^{B_k} q]. \quad (15)$$

Using the small angle approximation, equation (15) can be approximated with $$(I + \lfloor\tilde{\theta}(k+1|k)\times\rfloor)R[_{B_{k+1|k}}^G \hat{q}]$$

$$\approx (I + \lfloor\tilde{\theta}(k|k)\times\rfloor)R[_{B_{k|k}}^G \hat{q}](I + \lfloor\tilde{\theta}_l(k)\times\rfloor)R[_{B_{k+1}}^{B_k} \hat{q}],$$

where $\tilde{\theta}_l(k)$ is the error from the ICP algorithm for estimating the relative change in the orientation of the vehicle $_{B_{k+1}}^{B_k}\hat{q}$ at time-step k. The above equation becomes $$R[_{B_{k+1|k}}^G \hat{q}] + \lfloor\tilde{\theta}(k+1|k)\times\rfloor R[_{B_{k+1|k}}^G \hat{q}] \approx$$

$$R[_{B_{k|k}}^G \hat{q}]R[_{B_{k+1}}^{B_k} \hat{q}] + \lfloor\tilde{\theta}(k|k)\times\rfloor R[_{B_{k|k}}^G \hat{q}]R[_{B_{k+1}}^{B_k} \hat{q}] +$$

$$R[_{B_{k|k}}^G \hat{q}]\lfloor\tilde{\theta}(k)\times\rfloor R[_{B_{k+1}}^{B_k} \hat{q}] +$$

$$\lfloor\tilde{\theta}(k|k)\times\rfloor R[_{B_{k|k}}^G \hat{q}]\lfloor\tilde{\theta}(k)\times\rfloor R[_{B_{k+1}}^{B_k} \hat{q}]\} \approx 0$$

Since $R\lfloor\alpha\times\rfloor R^T = \lfloor R\alpha\times\rfloor$, then the orientation equation becomes $$R[_{B_{k+1|k}}^G \hat{q}] + \lfloor\tilde{\theta}(k+1|k)\times\rfloor R[_{B_{k+1|k}}^G \hat{q}] \approx$$

$$R[_{B_{k+1|k}}^G \hat{q}] + \lfloor\tilde{\theta}(k|k)\times\rfloor R[_{B_{k+1|k}}^G \hat{q}] +$$

$$R[_{B_{k|k}}^G \hat{q}]\lfloor\tilde{\theta}_l(k)\times\rfloor R[_{B_{k+1}}^{B_k} \hat{q}].$$

Right-multiplying both sides by $R^T[_{B_{k+1|k}}^G \hat{q}]$ yields $$\lfloor\tilde{\theta}(k+1|k)\times\rfloor \approx \lfloor\tilde{\theta}(k|k)\times\rfloor + R[_{B_{k|k}}^G \hat{q}]\lfloor\tilde{\theta}_l(k)\times\rfloor R^T[_{B_{k|k}}^G \hat{q}];$$

hence, $$\tilde{\theta}(k+1|k) \approx \tilde{\theta}(k|k) + R[_{B_{k|k}}^G \hat{q}]\tilde{\theta}l(k). \quad (16)$$

The receiver position propagation in equation (16) can be approximated with $$\hat{r}_r(k+1|k) = \tilde{r}_r(k+1|k) \approx \hat{r}_r(k|k) + \tilde{r}_r(k|k)$$
$$+ (I + \lfloor \tilde{\theta}(k|k) \times \rfloor) R[_{B_{k|k}}{}^G \hat{q}]({}^{B_k}\hat{r}_{B_{k+1}} + {}^{B_k}\tilde{r}_{B_{k+1}}),\quad (5)$$

which becomes $$\hat{r}_r(k+1|k) + \tilde{r}_r(k+1|k)$$
$$\approx \hat{r}_r(k|k) + R[_{B_{k|k}}{}^G \hat{q}]^{B_k}\hat{r}_{B_{k+1}}$$
$$+ \lfloor \tilde{\theta}(k|k) \times \rfloor R[_{B_{k|k}}{}^G \hat{q}]^{B_k}\hat{r}_{B_{k+1}}$$
$$+ \lfloor \tilde{\theta}(k|k) \times \rfloor R[_{B_{k|k}}{}^G \hat{q}]^{B_k}\tilde{r}_{B_{k+1}} \} \approx 0$$
$$+ \tilde{r}_r(k|k) + R[_{B_{k|k}}{}^G \hat{q}]^{B_k}\tilde{r}_{B_{k+1}} \} \tilde{r}_r(k+1|k)$$

Since $\lfloor a \times \rfloor b = -\lfloor b \times \rfloor a$, then the position error dynamics may be expressed as $$\tilde{r}_r(k+1|k) \approx \tilde{r}_r(k|k) - \lfloor R[_{B_{k|k}}{}^G \hat{q}]^{B_k}\hat{r}_{B_{k+1}} \times \rfloor \tilde{\theta}(k|k)$$
$$+ R[_{B_{k|k}}{}^G \hat{q}]^{B_k}\tilde{r}_{B_{k+1}},\quad (17)$$

Therefore, the prediction state estimate of the error state is given by $$\begin{bmatrix} \tilde{\theta}(k+1|k) \\ \tilde{r}_r(k+1|k) \\ \tilde{\Delta}x_{clk}(k+1|k) \\ \tilde{r}_s(k+1|k) \end{bmatrix} \approx F' \begin{bmatrix} \tilde{\theta}(k|k) \\ \tilde{r}_r(k|k) \\ \tilde{\Delta}x_{clk}(k|k) \\ \tilde{r}_s(k|k) \end{bmatrix} + \Psi' \begin{bmatrix} \tilde{\theta}_I(k) \\ {}^{B_k}\tilde{r}_{B_{k+1}} \\ 0 \\ 0 \end{bmatrix},$$

where $$F' = \mathrm{diag}[\Phi_R, \Phi_{clk}, I_{3N_s \times 3N_s}],$$
$$\Psi' = \mathrm{diag}\Big[R\big[{}^G_{B_{k|k}}\hat{q}\big],\ R\big[{}^G_{B_{k|k}}\hat{q}\big],\ I_{5N_s \times 5N_s}\Big],$$
$$\Phi_R = \begin{bmatrix} I & 0 \\ -\lfloor R\big[{}^G_{B_{k|k}}\hat{q}\big]^{B_k}\hat{r}_{B_{k+1}} \times \rfloor & I \end{bmatrix}.$$

The corresponding prediction estimation error covariance is given by $$P'(k+1|k) = F'P'(k+1|k)F'^T + \Psi' \begin{bmatrix} Q_I & 0 & 0 \\ 0 & Q_{clk} & 0 \\ 0 & 0 & 0_{3N_s \times 3N_s} \end{bmatrix} \Psi'^T.$$

Given the predicted estimation $\hat{r}_r(k+1|k)$, $\hat{r}_{s_n}(k+1|k)$, and $c\hat{\Delta}\delta t_n(k+1|k)$, the measurement prediction is computed from $$\hat{z}_{s_n}(k+1|k) = \|\hat{r}_r(k+1|k) - \hat{r}_{s_n}(k+1|k)\|_2 +$$
$$c\hat{\Delta}\delta t_n(k+1|k), n=1, \ldots, N_s.$$

Given cellular pseudorange measurements $z_s(k+1)$ the innovation $v_s(k+1)$ is subsequently computed. The measurement Jacobian in the SLAM mode takes the form $$H'(k+1) = [H'_{r_r,r_s} H_{clk} H'_{r_s,r_r}],$$

where $$H'_{r_r,r_s} = [h'_1, \ldots, h'_{N_s}]^T,$$
$$h'_n = \big[0_{1\times 3}\ -1'^T_{s_n}\big]^T, n = 1, \ldots, N_s,$$

$$H'_{r_s,r_r} = \mathrm{diag}\big[1'^T_{s_1}, \ldots, 1'^T_{s_{N_s}}\big],$$
$$1'_{s_n} = \frac{\hat{r}_{s_n}(k+1|k) - \hat{r}_r(k+1|k)}{\|\hat{r}_r(k+1|k) - \hat{r}_{s_n}(k+1|k)\|_2}, n=1, \ldots, N_s.$$

The Kalman gain $K'(k+1)$ is computed according to $$K'(k+1) = P'(k+1|k)H'(k+1)^T S'(k+1)^{-1},$$

where $S'(k+1) = H'(k+1)P'(k+1|k)H'(k+1)^T + \Sigma_S$ is the innovation covariance and $$\Sigma_s = \mathrm{diag}\big[\sigma^2_{s_1}, \ldots, \sigma^2_{s_{N_s}}\big]$$

is the measurement noise covariance.

The corrected state in the SLAM mode is more complex than the one in the mapping mode because of the orientation state. Define $$\xi \triangleq K'(k+1)v(k+1|k) \triangleq \begin{bmatrix} \xi_\theta \\ \xi_{r_r} \\ \xi_{\Delta x_{clk}} \\ \xi_{r_s} \end{bmatrix},$$

where the elements of $\xi$ denote the receiver's orientation, receiver's position, difference between the receiver's and cellular transmitters' clock bias and drift, and cellular tower's position corrections, respectively. Subsequently, the following update equations are obtained $$\hat{r}_r(k+1|k+1)\hat{r}_r(k+1|k)\xi_{r_r}$$
$$[\hat{\Delta}x_{clk}(k+1|k+1)] = [\hat{\Delta}x_{clk}(k+1|k)] + [\xi_{\Delta x_{clk}}],$$
$$\hat{r}_s(k+1|k+1)\hat{r}_s(k+1|k)\xi_{r_s}$$

and $$_{B_{k+1|k+1}}{}^G\hat{q} = {}_{B_{k+1|k}}{}^G\hat{q} \otimes \delta q_\xi,$$

where $$\delta q_\xi = \Big[\tfrac{1}{2}\xi^T_\theta, \sqrt{1 - \tfrac{1}{4}\xi^T_\theta \xi_\theta}\Big]^T.$$

The corresponding estimation error covariance is given by $$P'(k+1|k+1) = [I - K'(k+1)H'(k+1)]P'(k+1|k).$$

Figure 7:
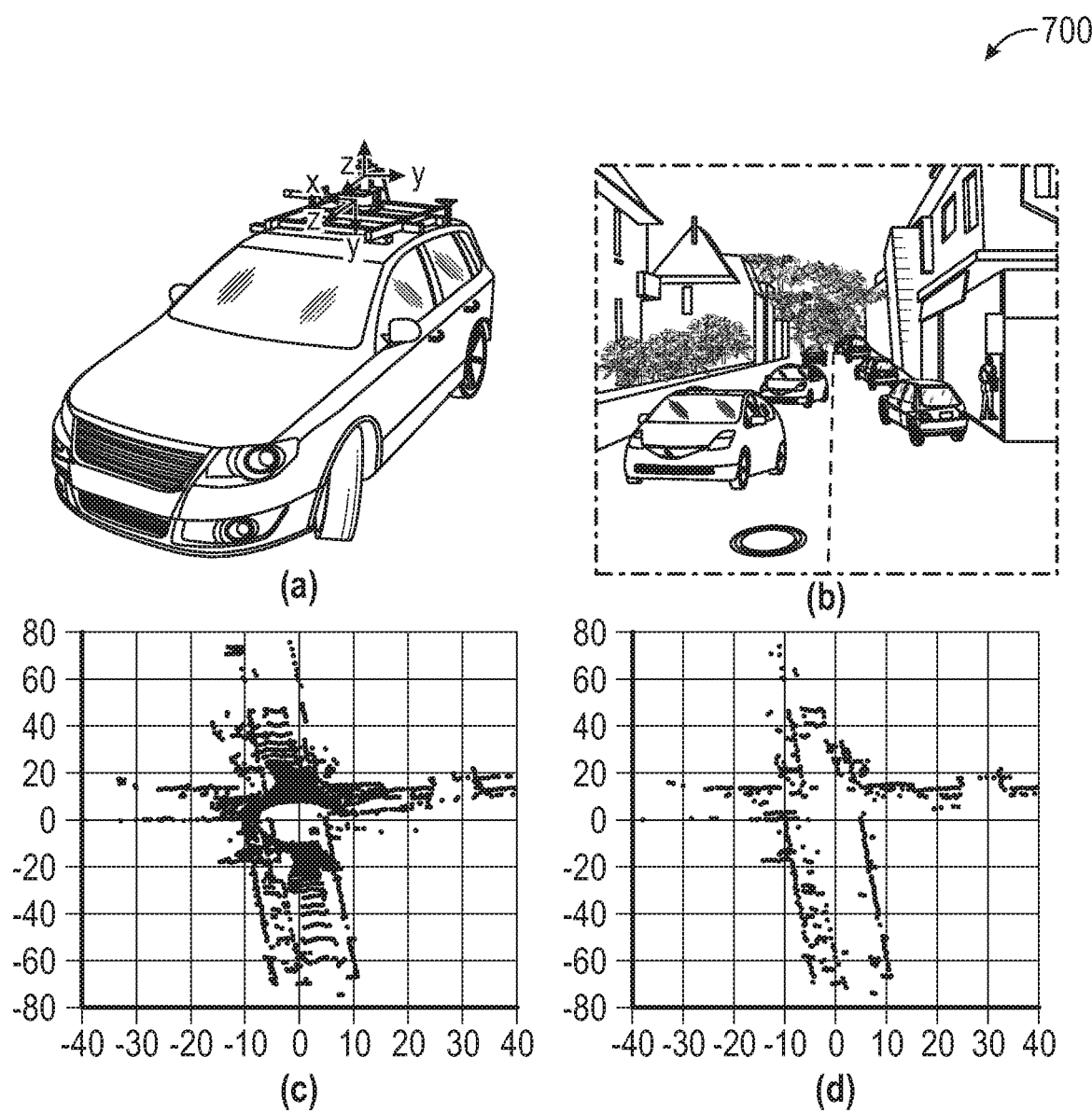
FIG. 7 is a diagram of a simulation test, in accordance with at least one embodiment.

FIG. 7 is a diagram of a simulation test 700, in accordance with at least one embodiment. A simulator used ground truth and real lidar data from a KITTI data benchmark. The simulator generated (1) the states of the vehicle-mounted receiver, (2) the cellular towers' states, and (3) pseudorange measurements made by the vehicle-mounted receiver on the cellular towers. The estimation error of cellular-aided navigation solution is compared with an ICP-only solution, and an evaluation is provided of the position estimation of the cellular towers.

The sensor configuration and vehicle used by KITTI are shown in FIG. 7. The vehicle is equipped with a lidar, a camera, and an integrated GPS-IMU system which is used for ground truth acquisition. FIG. 7 shows an example environment in which the vehicle used by KITTI was driven for data collection. FIG. 7 also shows a sample point cloud of the data from the KITTI data set and feature points and detected edges produced by the proposed algorithm discussed in FIG. 3 for the point cloud. Each laser scan returns around 120,000 points in 3-D space. To enable real-time processing, these systems and methods uses only 2.5% of the total points in each scan.

A data set from the KITTI benchmark is used to perform the simulation test. The KITTI Vision Benchmark Suite is a public computer vision and robotic algorithm benchmarking data set which covers different types of environments, including urban and suburban areas in the city of Karlsruhe, Germany. FIG. 7, shows the recording platform and sensor setup which has been used to record the data set. FIG. 7 also shows a top view of a point cloud taken from an intersection and the corresponding visual image. The blue point cloud contains all points captured by the lidar and the black point cloud represents corresponding edges and feature points. Each laser scan returns around 120,000 points in 3-D space. To enable real-time processing, these systems and methods uses only 2.5% of the total points in each scan. The KITTI benchmark also provides the GPS-IMU data, which is assumed to be the ground truth.

Four different trajectories from the KITTI benchmark were processed (e.g., tests 1A). Pseudoranges from a varying number of cellular towers were simulated. The cellular towers were assumed to be equipped with oven-controlled crystal oscillators (OCXO), while the vehicle-mounted receiver was assumed to be equipped with a temperature-compensated crystal oscillator (TOXO). The simulation settings are summarized in Table I:

TABLE I

| Parameter | Definition | Value |
|---|---|---|
| $r_r$ | Vehicle's initial position | $[0, 0, 0]^T$ m |
| $N_s$ | Number of towers | 2-5 |
| T | Sampling time | 0.1 s |
| $\sigma_{s_n}^2$ | Measurement noise variance | 10 m$^2$ |
| $\{S_{\tilde{\omega}_{\delta t,sn}}\}_{n=1}^{N_s}$ | Clock bias process noise power spectral density of transmitters | $4 \times 10^{-20}$ s |
| | | $7.89 \times 10^{-22}$ 1/s |
| $\{S_{\tilde{\omega}_{\delta t,s_n}}\}_{n=1}^{N_s}$ | Clock drift process noise power spectral density of transmitters | |
| $S_{\tilde{\omega}_{\delta t,r}}$ | Clock bias process noise power spectral density of the receiver | $4.7 \times 10^{-20}$ s |
| $S_{\tilde{\omega}_{\delta t,r}}$ | Clock drift process noise power spectral density of the receiver | $7.5 \times 10^{-20}$ 1/s |
| κ | Lidar nearest neighbor layers | {−2, −1, 0, 1, 2} |
| η | Lidar layer filter threshold | 1 |
| $r_{s_1}$ | Tower 1 location | $[-2100, 1900, 0]^T$ m |
| $r_{s_2}$ | Tower 2 location | $[2000, 2500, 0]^T$ m |
| $r_{s_3}$ | Tower 3 location | $[900, -2300, 0]^T$ m |
| $r_{s_4}$ | Tower 4 location | $[3100, 1500, 0]^T$ m |
| $r_{s_5}$ | Tower 5 location | $[1000, 1000, 0]^T$ m |

The vehicle was assumed to know its state and be in the mapping mode only for the first 5 seconds. Then, the vehicle was assumed to lose access to GLASS signals and entered the SLAM mode. The EKF of the mapping mode was initiated with $\hat{r}_{s_n}(0|-1) \sim \mathcal{N}[r_{s_n}(0), P_{r_{s_n}}(0|-1)]$, where $P_{r_{s_n}}(0|-1) \equiv (10^6) \cdot \text{diag}[1,1,1]$, for $n = 1, \ldots, N_s$ and $\Delta \hat{x}_{clk,s_n}(0|-1) \sim \mathcal{N}[\Delta x_{clk,s_n}(0), P_{clk,s_n}(0|-1)]$, where $P_{clk,s_n}(0|-1) \equiv (10^4) \cdot \text{diag}[3,0.3]$.

Figure 8:
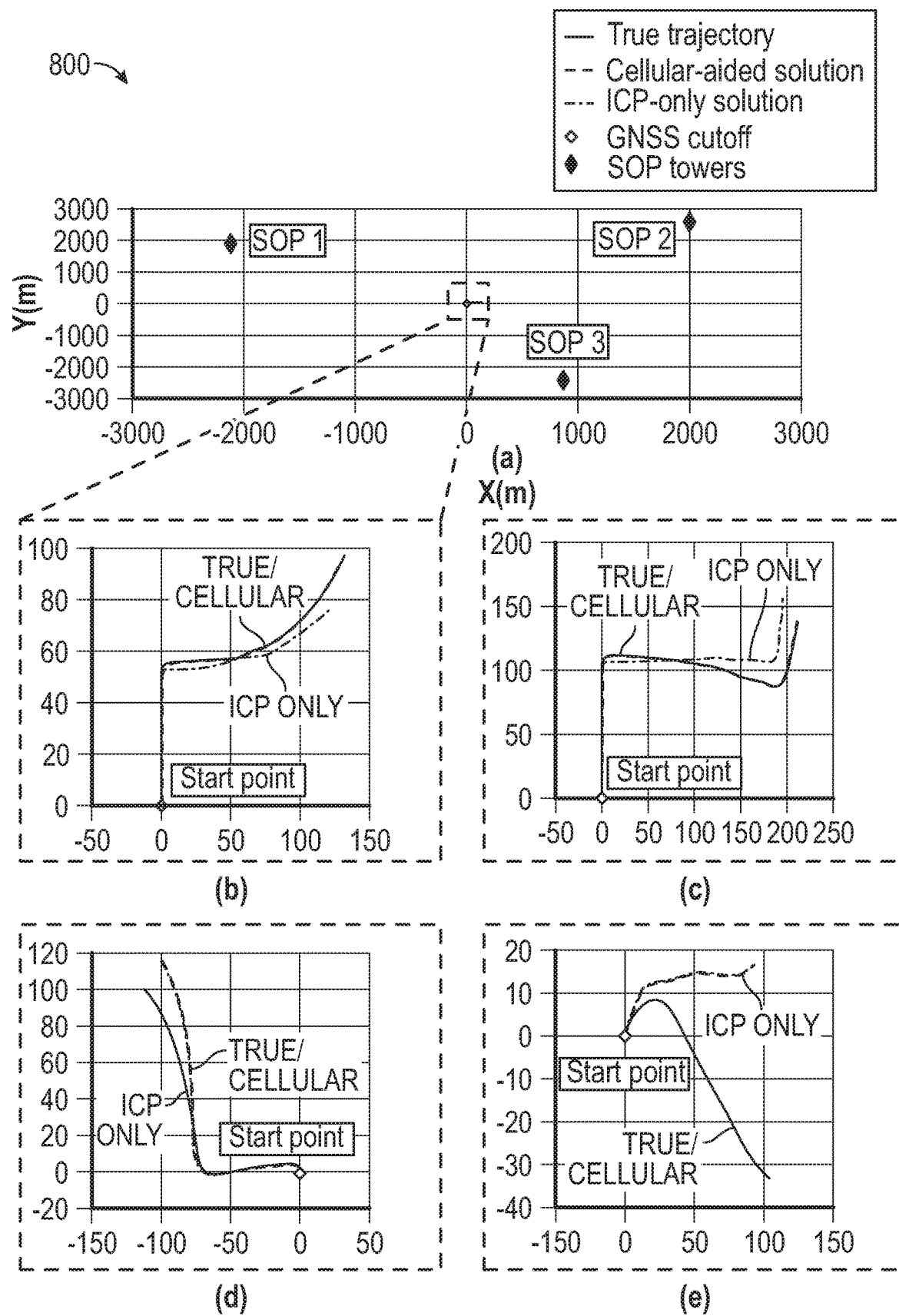
FIG. 8 is a diagram of navigation results, in accordance with at least one embodiment.

FIG. 8 is a diagram of navigation results 800, in accordance with at least one embodiment. In FIG. 8, the trajectory traversed by the vehicle is illustrated along with the position of 3 cellular towers. Four different scenarios from the KITTI data set with simulated cellular pseudoranges. In each scenario, the ground truth and the ICP-only and the cellular-aided navigation solutions are depicted. As can be seen, the proposed approach outperforms the ICP-only solution.

Navigation results 800 shows true trajectories by the vehicle for the four KITTI data sets. Also shown in FIG. 8 are the ICP-only lidar estimated trajectory and the proposed cellular-aided lidar trajectory, 95% of the traversed trajectory in FIG. 8 was without GNSS. It is evident from FIG. 8 that the cellular-aided lidar trajectory closely matched the true trajectory, while the ICP-only lidar trajectory drifted from the true trajectory. Lidar-based navigation frameworks may achieve position accuracy within a lane-level. However, in this simulation, only 2.5% of the total scanned points were used in the ICP algorithm, causing a significant drift in the ICP-only solution. It can be seen from FIG. 8(e) that using only 2.5% of the scanned points degrades the ICP-only solution dramatically.

The performance of these systems and methods is compared with both the ICP-only and cellular-only navigation solutions. Table II summarizes the position RUSE with the ICP-only method, cellular-only method, and the proposed cellular-aided lidar method:

TABLE II

| Test | ICP-only RMSE (m) | Cellular-only RMSE (m) | Cellular-aided RMSE (m) | Ratio of the error to total driven distance % |
|---|---|---|---|---|
| Test 1 | 10.15 | 8.42 | 1.57 | 0.88% |
| Test 2 | 11.78 | 7.68 | 1.78 | 0.6% |
| Test 3 | 8.49 | 9.14 | 2.11 | 1.4% |
| Test 4 | 26.16 | 5.14 | 0.60 | 0.75% |

These results correspond to the KITTI data set scenarios. The reduction in the estimation error upon fusing lidar data with cellular pseudoranges is significant and the estimates are at the lane-level.

In order to evaluate the impact of the number of cellular towers on the navigation performance, the first data set (Test 1) was repeated for $N_s = 2, \ldots, 5$. The resulting position-RMSE and maximum error are tabulated in Table III, which shows position estimation error with the proposed cellular-aided lidar for a varying number of cellular towers $N_s$:

TABLE III

| Number of towers ($N_s$) | RMSE error (m) | Max. error (m) |
|---|---|---|
| 2 | 2.98 | 5.69 |
| 3 | 1.57 | 3.58 |
| 4 | 1.27 | 3.01 |
| 5 | 1.25 | 3.12 |

Comparable results were observed with the other data sets.

Figure 9:
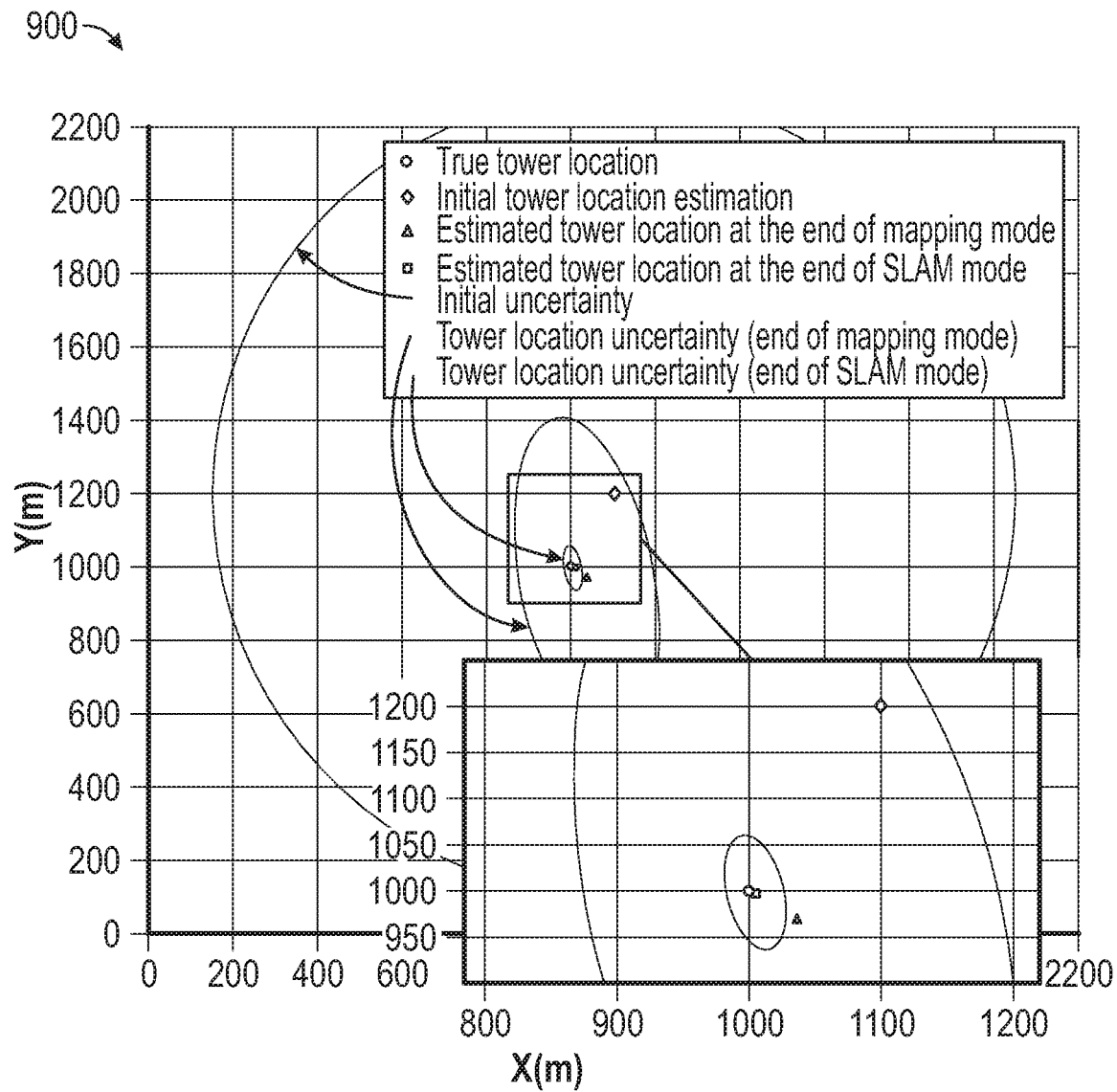
FIG. 9 is a diagram of a tower uncertainty, in accordance with at least one embodiment.

FIG. 9 is a diagram of a tower uncertainty 900, in accordance with at least one embodiment, in particular, FIG. 9 illustrates the position of cellular tower, the initial estimate and corresponding uncertainty before the mapping mode, the estimate and corresponding uncertainty at the end of the mapping mode, and the estimate and corresponding uncertainty at the end of the SLAM mode for the first data set (Test 1). Comparable results were observed for other towers and data sets.

Table IV compares the computation time between the proposed ICP and other approaches:

TABLE IV

| Method | Computation time (s) | Iteration |
| --- | --- | --- |
| Regular ICP | 12.25 | 36 |
| ICP in [32] | 7.23 | 29 |
| k-d tree | 6.82 | 27 |
| Ak-d tree [46] | 0.94 | 28 |
| ACK-d tree [8] | 0.28 | 27 |
| Proposed method | 0.23 | 25 |

It can be seen that the proposed neighbor searching method leads to faster convergence for registering the corresponding points of two successive lidar frames, while it achieves comparable accuracy.

In contrast to existing lidar-based localization approaches where the accuracy of localization and mapping highly depends on the number of processed points in the point cloud, these systems and methods uses only 2.5% of the total points in each scan while continuously achieving lane-level accuracy. This results in a significant decrease in the computational burden, making these systems and methods suitable for real-time applications. In order to evaluate the impact of the reduction of the processed points in each scan on the navigation performance, the second data set (Test 2) was repeated by varying the number of processed points in the scanned point cloud. The position RMSE values are summarized in Table V:

TABLE V

| | RMSE 2-D (m) | |
| --- | --- | --- |
| % of the total points used in ICP | ICP-only solution | Cellular-aided solution |
| 80% | 2.54 | 0.91 |
| 50% | 5.49 | 1.25 |
| 10% | 9.27 | 1.42 |
| 2.5% | 11.78 | 1.78 |

It can be seen that reducing the processed points in the point cloud does not have a considerable effect on the proposed cellular-aided solution accuracy. In contrast, reducing the processed points in the point cloud dramatically degrades the ICP-only solution accuracy.

The presented simulation shows that these systems and methods yielded superior results to the ICP-only navigation solution. Additionally, the simulation results demonstrate that exploiting more towers yields a more accurate navigation solution, as expected. It is evident from Table III that increasing $N_s$ from 2 to 3 yields the most improvement. Further, the proposed cellular-aided approach achieved significantly lower estimation error with fewer lidar scanned points than the ICP-only navigation solution. This is due to exploiting cellular SOPs eliminating the drift arising from not using enough lidar scanned points in the ICP algorithm.

Figure 10:
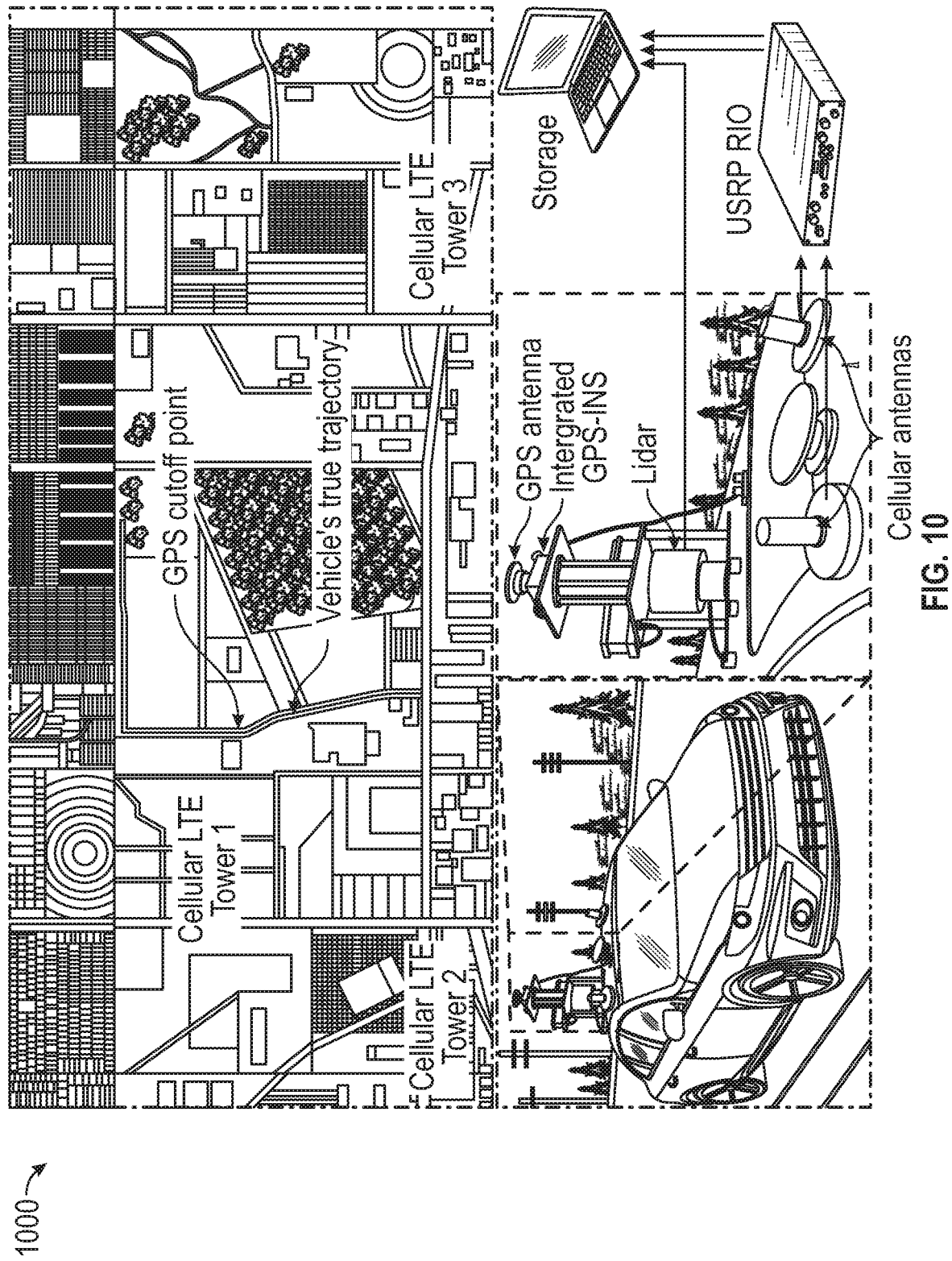
FIG. 10 illustrates this experimental hardware setup and traversed trajectory.

FIG. 10 is a diagram of a vehicle-mounted receiver setup 1000, in accordance with at least one embodiment. A vehicle was equipped with a Velodyne HDL-64E lidar sensor whose x-axis points toward the front of the vehicle, z-axis points upward, and y-axis points to the right side of the car. The parameters of the lidar sensor are summarized in Table VI:

TABLE VI

| Parameter | Value |
| --- | --- |
| Measurement range | Up to 120 m |
| Vertical field of view | +2.0° to −24.9° |
| Horizontal field of view | 360° |
| Rotation rate | 5-20 Hz |
| Angular resolution | 0.4° |
| Accuracy | ±2.0 cm |

The Velodyne scanner takes depth measurements continuously while rotating around its vertical axis. The frames returned by the lidar contain 90,000 3-D points. These systems and methods used 4,200 points of the point cloud (4.6% of the points). Over the course of the experiment, the ground-truth trajectory of the vehicle was obtained from its integrated GPS-IMU navigation system. The IMU returns six measurements (accelerations and rotational rates along the three orthogonal axes of the body frame B) at a rate of 100 Hz.

The car was also equipped with two cellular antennas to acquire and track signals from nearby cellular LTE towers. The LTE antennas used for the experiment were consumer-grade 800/1900 MHz cellular antennas. The signals were simultaneously down-mixed and synchronously sampled via a National Instruments (NI) dual-channel universal software radio peripheral (USRP)-2954R, driven by a GPS-disciplined oscillator (GSPDO). The clock bias and drift process noise power spectral densities of the receiver were set to be $1.3 \times 10^{-22}$ s and $7.89 \times 10^{-25}$ 1/s respectively, according to oven-controlled crystal oscillators (OCXO) used in (USRP)-2954R. The measurement noise covariance was set to be 10 m², which were obtained empirically. The receiver was tuned to a carrier frequency of 1955 MHz, which is a channel allocated for U.S. cellular provider AT&T. Samples of the received signals were stored for off-line post-processing. The software-defined receiver (SDR) developed in was used to produce LTE pseudoranges. For this field experiment, it was known to the receiver that the received signals pertain to cellular LTE base stations (also known as eNodeBs). If the signal structure is unknown, several SOP SDR modules (e.g., cellular code-division multiple access (CDMA), FM, etc.) may be run in parallel until the received signal is recognized, acquired, tracked, and data association between the produced pseudorange and the corresponding SOP transmitter is performed. FIG. 10 illustrates this experimental hardware setup and traversed trajectory.

Figure 11:
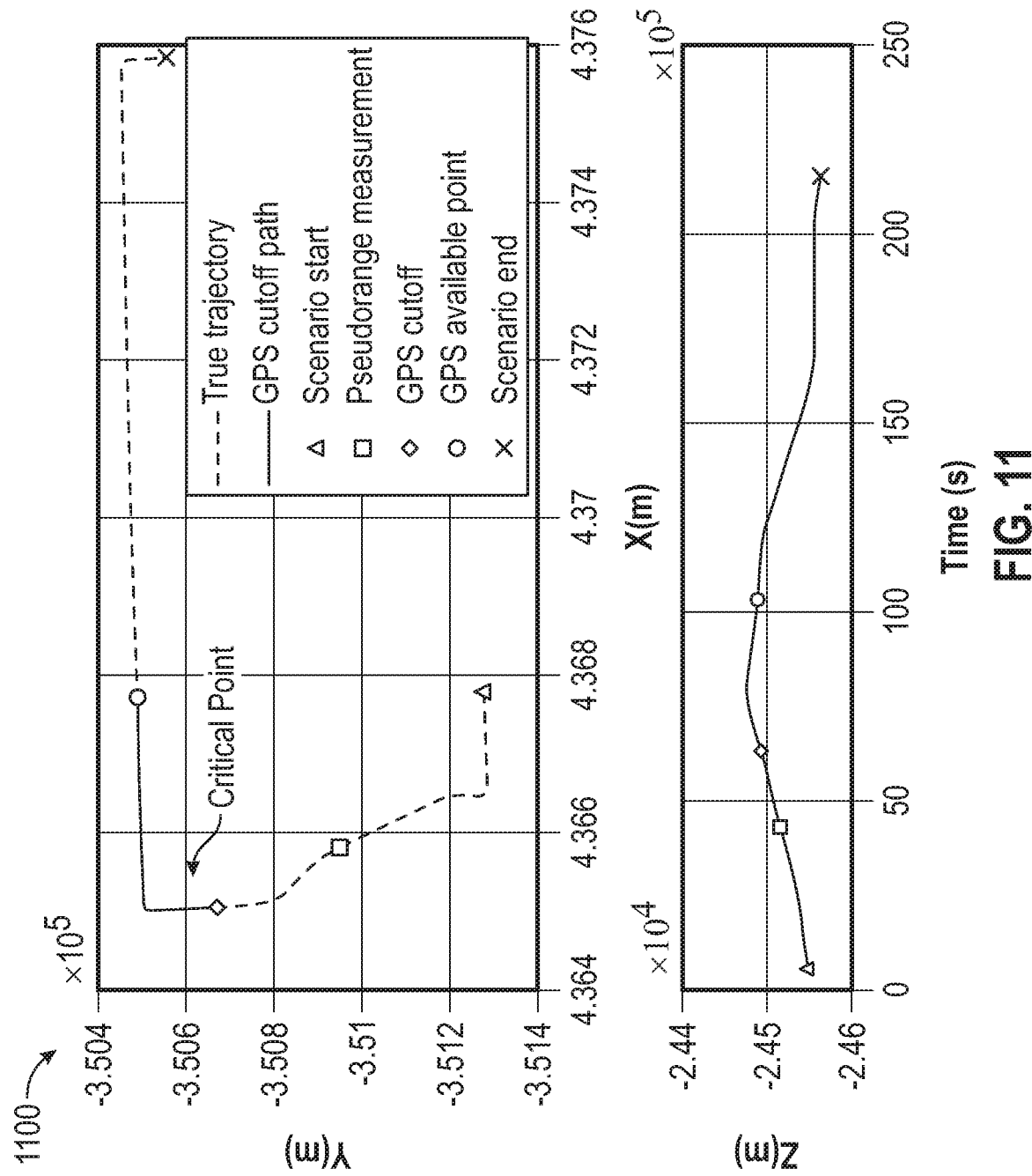
FIG. 11 is a diagram of a vehicle trajectory, in accordance with at least one embodiment.

FIG. 11 is a diagram of a vehicle trajectory 1100, in accordance with at least one embodiment. FIG. 11 shows a vehicle trajectory in x-y plane and a vehicle trajectory in z axis. The dashed line indicates the entire traversed trajectory. A wide line indicates the part of the trajectory where GPS signals were unavailable. The location where the first cellular pseudorange is produced, the location where GPS signals become unavailable, and the location where the vehicle get access to GPS again are also indicated.

The vehicle trajectory 1100 was generated by a car that has access GPS starts driving in a straight segment heading up to a turning point. At about 200 m before the turning point, GPS signals become unavailable and remain so until the car travels 300 in after the turning point. At the starting point, the position and orientation of the vehicle are directly observable from the integrated GPS-IMU navigation system. The vehicle's North and East coordinates are shown in the first plot of FIG. 11, and the down component is shown in the second plot as a function of time. The vehicle starts by moving in the West direction. After 200 m, it makes a right turn heading North. After another 200 m, the vehicle-mounted cellular receiver starts producing pseudoranges to three unknown LTE eNodeBs, such as can be seen in the square-shaped segment in FIG. 11, which indicates the beginning of the mapping mode. The car keeps moving for 200 m then reaches the turning point where GPS becomes unavailable, leaving only cellular measurements to correct the lidar errors. When the vehicle reaches the narrow turning point (e.g., the critical point in FIG. 11), it heads in the East direction. The segment in which GPS was unavailable is indicated by the green diamond-shaped marker in FIG. 11. This amounts to 40 seconds of GPS unavailability.

This experimental test was conducted in a suburban area in Riverside, Calif., USA where GPS signals were available along the entire trajectory to provide ground truth. However, the navigation solution obtained from the UPS receiver is discarded to emulate a GPS cutoff period during the experiment, such as shown as the segment of the trajectory in FIG. 11. In the experiment area the cellular towers were obstructed and far from the vehicle (e.g., more than 1.7 km), and large portion of the vehicle's trajectory had no clear LOS to the cellular towers.

Figure 12:
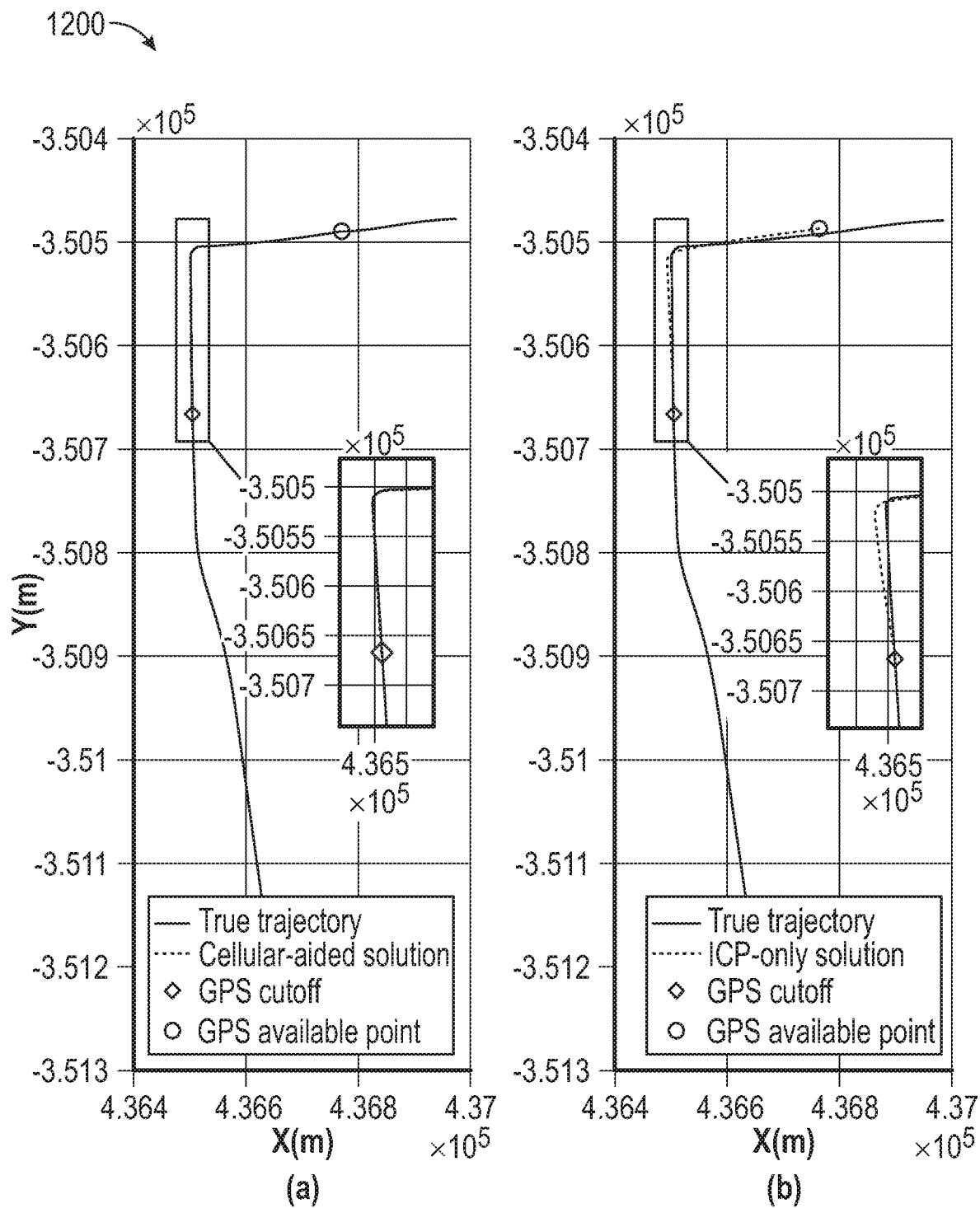
FIG. 12 is a diagram of 2-D vehicle trajectory in accordance with at one embodiment.

FIG. 12 is a diagram of 2-D vehicle trajectory 1200, in accordance with at least one embodiment. In particular, FIG. 12(a) shows the cellular-aided solution described herein and FIG. 12(h) shows the ICP-only solution. The 3-D and 2-D vehicle position RMSEs of the cellular-aided navigation solution during UPS unavailability were 4.07 and 1.5 m, respectively. In contrast, when using ICP-only, the 3-D and 2-D RMSEs increased to 9.02 and 4.7 m, respectively. Hence, the proposed method yielded a 68% reduction in the 2-D RAISE over lidar odometry-only. The mean and maximum errors for both 2-D and 3-D estimates are tabulated in Table VII:

TABLE VII

| Error (m) | ICP-only solution | Cellular-aided solution | Improvement | Ratio of the error to total driven distance % |
|---|---|---|---|---|
| RMSE 3-D | 9.02 | 4.07 | 54.87% | 1.3% |
| RMSE 2-D | 4.73 | 1.50 | 68.28% | 0.5% |
| Mean 3-D | 10.7 | 4.23 | 60.46% | 1.4% |
| Mean 2-D | 8.16 | 1.26 | 84.55% | 0.4% |
| Max. 3-D | 15.14 | 5.07 | 66.51% | 1.6% |
| Max. 2-D | 10.03 | 2.10 | 79.06% | 0.7% |

The maximum receiver position error using ICP-only was found to be 10.03 m for the 2-D estimate, whereas the maximum error using cellular aiding was 2.1 m. It can be seen from Table VII that the proposed method significantly reduced the position error and achieved a 2-D mean position error of 1.26 m, which is within the lane-level. It is worth noting that other work in the published literature achieved a comparable accuracy by fusing lidar with other sensors (e.g., vision, DGPS, and IMU). However, the main motivation of these systems and methods is that in the absence of an aiding source to lidar, lidar odometry errors will accumulate. As described herein lidar may be augmented with cellular signals of opportunity in the environment without the need to couple lidar with sensors or GNSS signals.

For a comparative analysis, the results achieved by these systems and methods is compared to the results achieved by a lidar odometry and mapping (LOAM) solution. In an example, LOAM may achieve an accuracy of 0.9% over a distance of 58 in, while the accuracy obtained by the proposed cellular-aided solution was 0.4% over a distance of 300 in. It is worth noting that only, three cellular towers were exploited in this experiment. As is shown in simulation result section, the RMSE reduction in cellular aiding will be even more significant when more towers are included. Moreover, note that the 2-D solution is more precise than the 3-D solution. This is due to the poor vertical dilution of precision inherent to terrestrial towers and minimal diversity in the towers' vertical positions.

Figure 13:
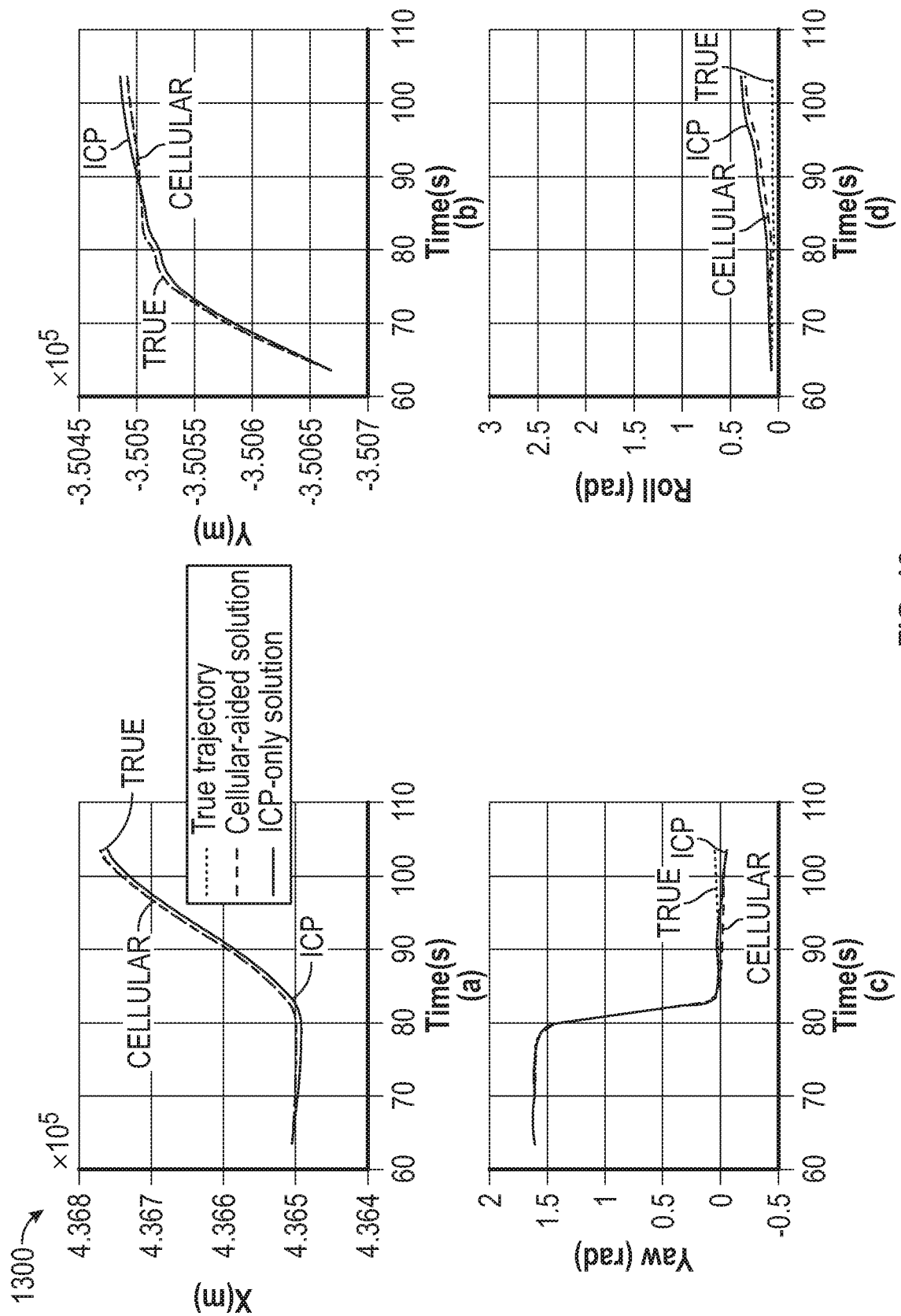
FIG. 13 is a diagram of horizontal position solutions, in accordance with at least one embodiment.

FIG. 13 is a diagram of horizontal position solutions 1300, in accordance with at least one embodiment. In particular, the elements of the position and orientation vectors of the receiver during GPS unavailability are illustrated in FIG. 13. In this figure, the true trajectory and ICP-only and cellular-aided solutions are plotted. FIG. 13(a) and FIG. 13(b) correspond to the x and y coordinates of the receiver, respectively. These show the true trajectory and the cellular-aided and ICP-only solutions, respectively. FIG. 13(c) and FIG. 13(d) correspond to the yaw and roll elements of the vehicle's orientation. The following may be concluded from these plots. First, without aiding, a significant error is observed in both the position and orientation estimate of the vehicle when GPS signals are unavailable. With cellular aiding, these errors are reduced significantly. Second, the proposed approach is robust in areas with limited LOS to cellular towers. Third, experimental results show that using pseudoranges from 3 towers is sufficient to achieve lane-level 2-D position accuracy.

Figure 14:
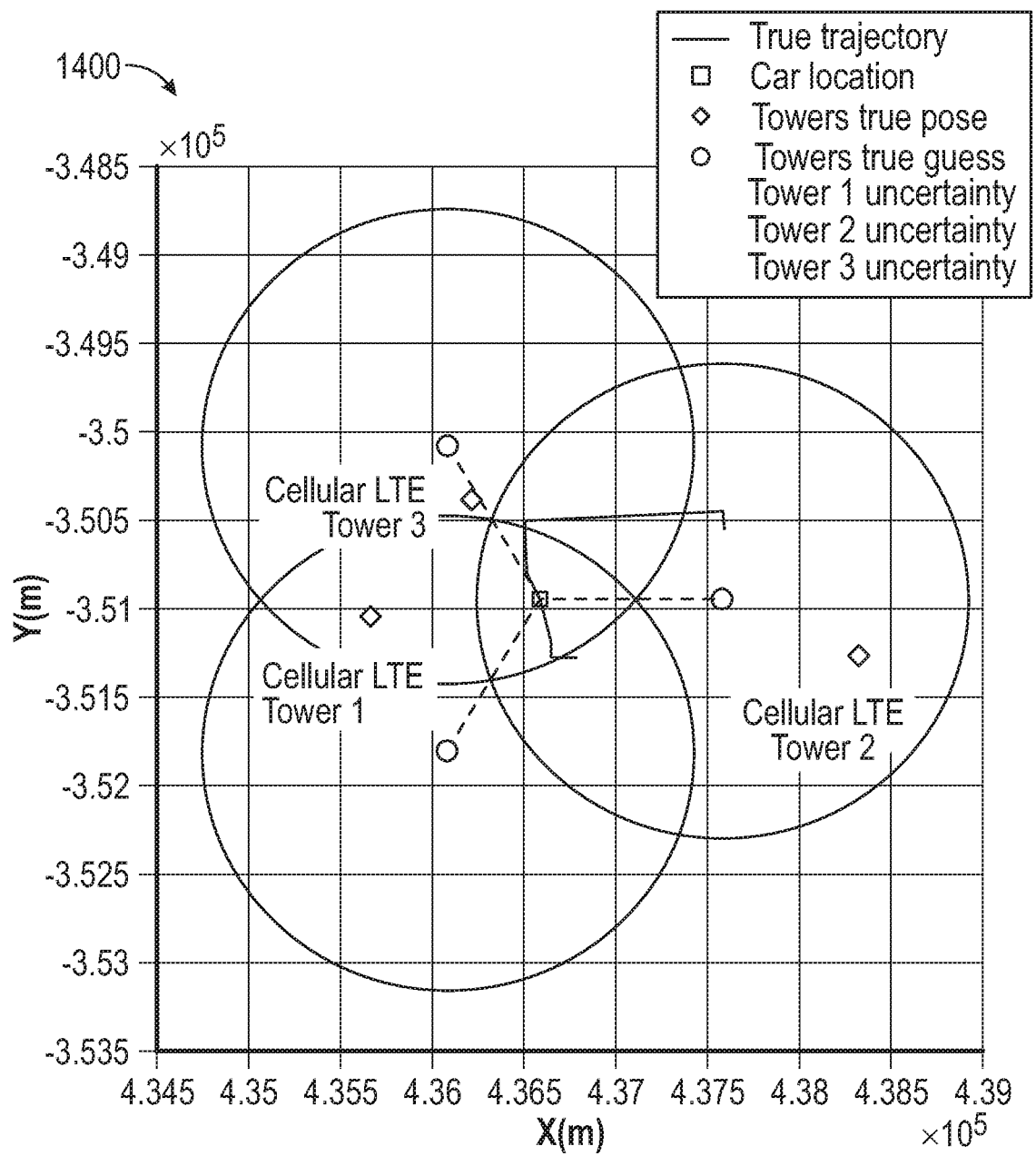
FIG. 14 is a diagram of a cellular state estimation results, in accordance with at least one embodiment.

FIG. 14 is a diagram of a cellular state estimation results 1400, in accordance with at least one embodiment. In particular, FIG. 14 illustrates the initial uncertainty in the EKF for the tower positions as the vehicle enters the mapping mode. In this figure, the vehicle has access to GPS signals, and the mapping mode solution described herein is employed to estimate the transmitters' states. The initial cellular position estimates were initialized using a symmetric array of cellular towers, leveraging the known structure of cellular networks. As shown in FIG. 14, the endpoints of an equilateral triangle were used as the initial cellular towers position estimates in this experimental test. The initial uncertainty in the towers' positions is set to 1 km. This uncertainty is large enough, based on the experimental records captured from Google Earth. The clock error state estimates were also initialized according to the approach presented in, in which the state estimate in the EKF was initialized according to $$\hat{\Delta x}_{clk,s_n}(0|-1) \sim \mathcal{N}[\Delta x_{clk,s_n}(0), P_{clk,s_n}(0|-1)],$$

where $\Delta x_{clk,s_n}(0) = [c\Delta\delta t_n(0), c\Delta\dot{\delta} t_n(0)]$ and $P_{clk,s_n}(0|-1) \equiv (10^4) \cdot \text{diag}[3,0.3]$ and $c\Delta\delta t_n(0) \triangleq d_r(0) - z_{s_n}(0)$ and $c\Delta\dot{\delta} t_n(0) \triangleq (\Delta\delta t_n(1) - \Delta\delta t_n(0))/T$, where $d_r(0)$ is the distance between the receiver and the transmitters, calculated using the last coordinate obtained from GNSS signals, and $P_c(0|-1) \equiv (10^4) \cdot \text{diag}[3,0.3]$.

Figure 15:
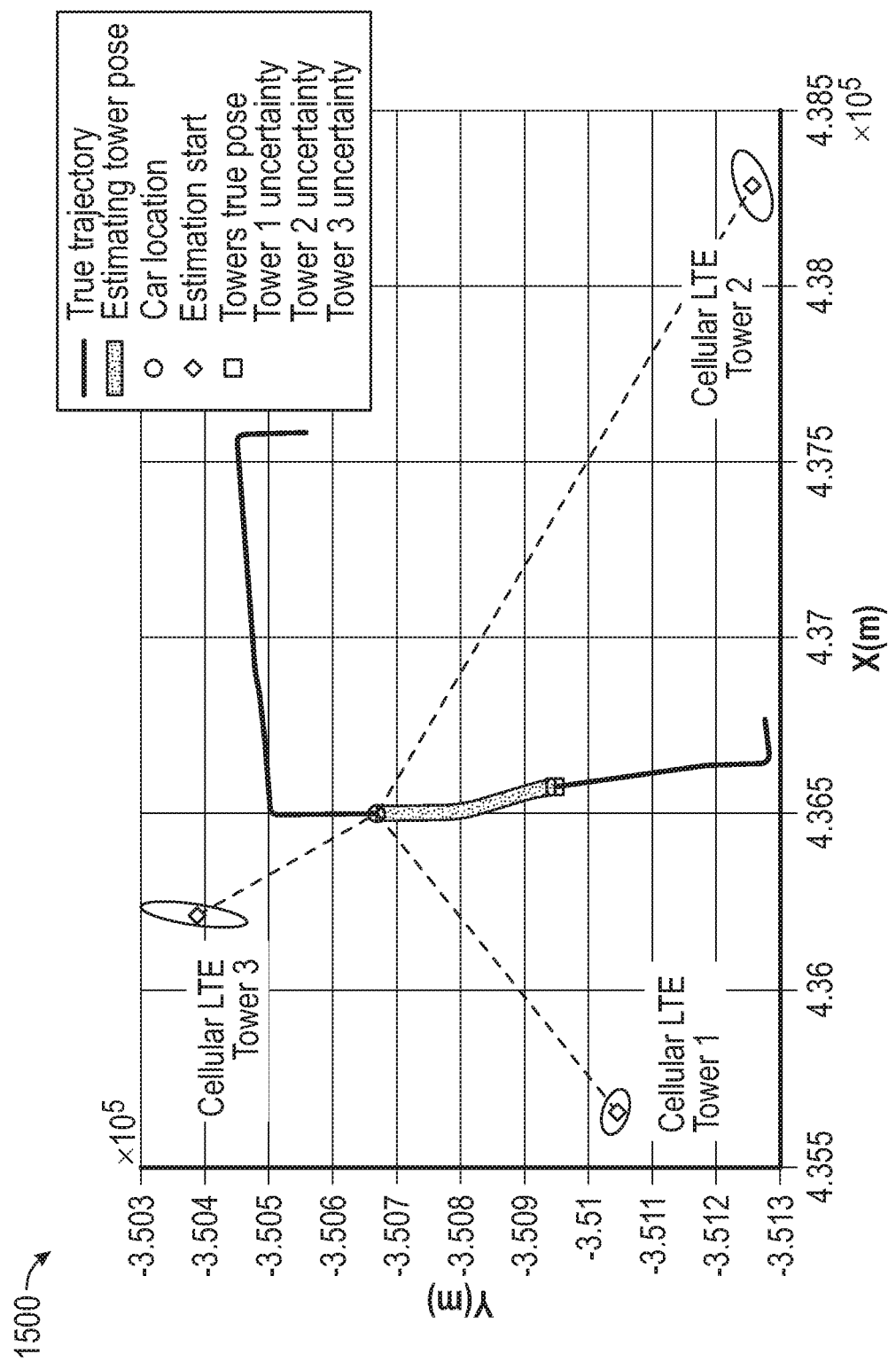
FIG. 15 is a diagram of a GPS cutoff trajectory, in accordance with at least one embodiment.

FIG. 15 is a diagram of a GPS cutoff trajectory 1500, in accordance with at least one embodiment. In particular, FIG. 15 illustrates the towers' position estimates and the associated uncertainties at the moment GPS is cutoff. After this point, the SLAM mode solution is employed to simultaneously map the cellular transmitters and localize the vehicle. FIG. 15 shows the path during which GPS was available and the vehicle was in mapping mode.

The transmitters position estimation errors at key points on the total trajectory are tabulated in Table VIII:

TABLE VIII

| Point on trajectory | Tower 1 error (m) | Tower 2 error (m) | Tower 3 error (m) |
| --- | --- | --- | --- |
| Start of mapping mode | 576.39 | 804.97 | 476.31 |
| GPS cutoff | 12.23 | 9.95 | 10.56 |
| GPS available again | 3.97 | 1.79 | 3.69 |

It can be seen that, the initial error for the third cellular tower was 476.31 m. By the end of the mapping mode, this error was reduced to 10.56 m. By the end of the SLAM mode, this error was reduced to below 5 m.

Figure 16:
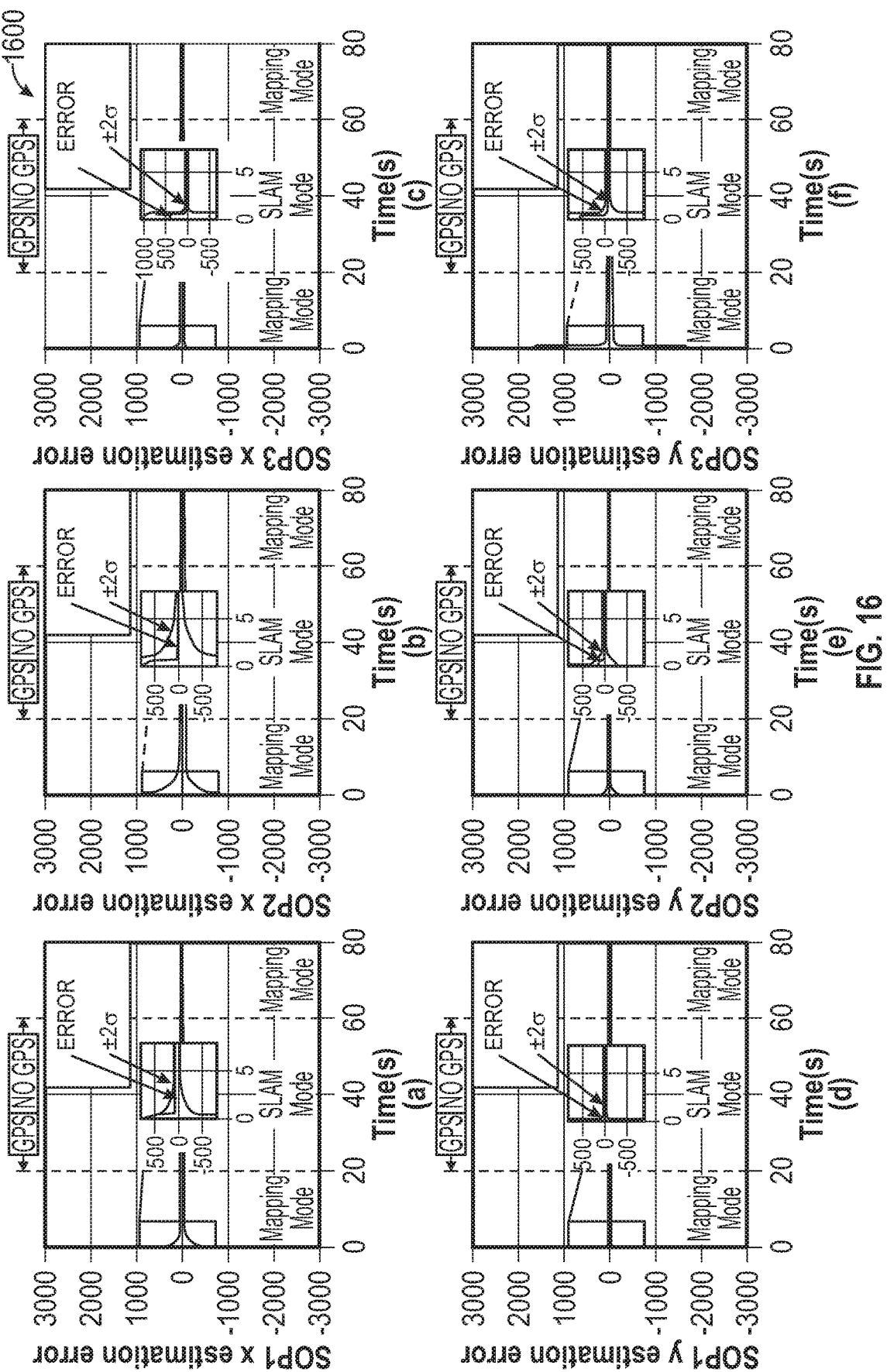
FIG. 16 is a diagram of position estimation error trajectories, in accordance with at least one embodiment.

FIG. 16 is a diagram of position estimation error trajectories 1600, in accordance with at least one embodiment. In particular, FIG. 16 shows the position estimation error trajectories and corresponding ±2σ for the three cellular towers. FIG. 16(*a*), FIG. 16(*b*), and FIG. 16(*c*) illustrate the x position error for all cellular transmitters over the entire trajectory. This shows the moment GPS signals became unavailable and the moment GPS signals became available again. FIG. 16(*d*), FIG. 16(*e*), and FIG. 16(*f*) illustrate the y position error for all towers. In both the mapping mode and SLAM mode, the estimation error uncertainties converged and remained bounded, as expected. Second, it can be seen from FIG. 16(*d*), FIG. 16(*e*), and FIG. 16(*f*) that the estimator's transient phase is less than 5 seconds.

Next, the performance of these systems and methods is compared with the cellular-only navigation solution presented in. In, only cellular transmitters 1 and 2 were used. Therefore, the experimental results presented herein were processed again using only two cellular transmitters. Table IX compares the navigation performance obtained by the proposed algorithm versus that of the cellular-only navigation solution:

TABLE IX

| Performance measure | Cellular-only navigation solution | Proposed approach |
| --- | --- | --- |
| RMSE 2-D | 9.32 m | 1.91 m |
| Standard deviation 2-D | 4.36 m | 1.21 m |
| Max. 2-D | 33.47 m | 6.73 m |

It can be seen that incorporating the cellular and lidar algorithm described herein reduced the position RMSE by 79% from the RMSE obtained by a cellular-only navigation solution.

Figure 17:
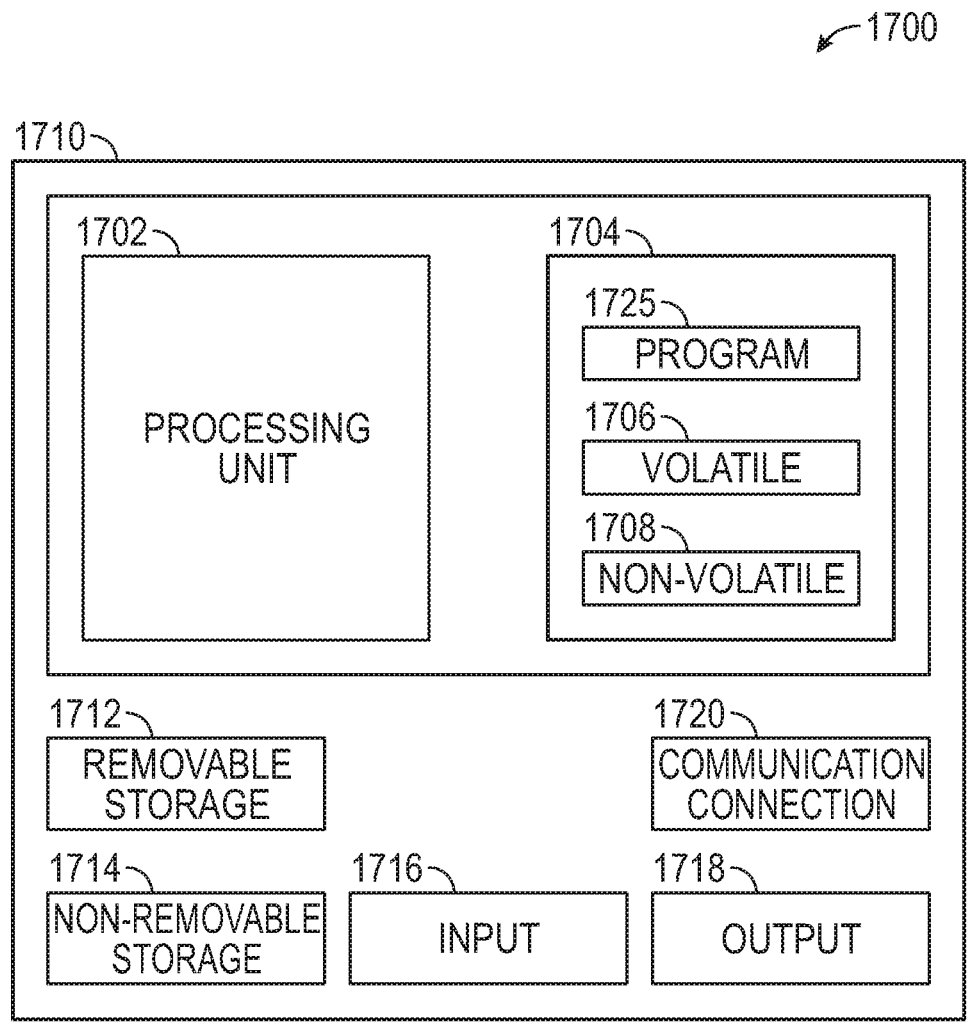
FIG. 17 is a block diagram of a computing device, according to an embodiment.

FIG. 17 is a block diagram of a computing device 1700, according to an embodiment. In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 17 is an example of a client device that may invoke methods described herein over a network. In other embodiments, the computing device is an example of a computing device that may be included in or connected to a motion interactive video projection system, as described elsewhere herein. In some embodiments, the computing device of FIG. 17 is an example of one or more of the personal computer, smartphone, tablet, or various servers.

One example computing device in the form of a computer 1710, may include a processing unit 1702, memory 1704, removable storage 1712, and non-removable storage 1714. Although the example computing device is illustrated and described as computer 1710, the computing device may be in different forms in different embodiments. For example, the computing device may instead be a smartphone, a tablet, or other computing device including the same or similar elements as illustrated and described with regard to FIG. 17. Further, although the various data storage elements are illustrated as part of the computer 1710, the storage may include cloud-based storage accessible via a network, such as the Internet.

Returning to the computer 1710, memory 1704 may include volatile memory 1706 and non-volatile memory 1708. Computer 1710 may include or have access to a computing environment that includes a variety of computer-readable media, such as volatile memory 1706 and non-volatile memory 1708, removable storage 1712 and non-removable storage 1714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1710 may include or have access to a computing environment that includes input 1716, output 1718, and a communication connection 1720. The input 1716 may include one or more of a touchscreen, touchpad, mouse, keyboard, camera, and other input devices. The input 1716 may include a navigation sensor input, such as a GNSS receiver, a SOP receiver, an inertial sensor (e.g., accelerometers, gyroscopes), a local ranging sensor (e.g., lidar), an optical sensor (e.g., cameras), or other sensors. The computer may operate in a networked environment using a communication connection 1720 to connect to one or more remote computers, such as database servers, web servers, and other computing device. An example remote computer may include a personal computer (PC), server, router, network PC, a peer device or other common network node, or the like. The communication connection 1720 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 1702 of the computer 1710. A hard drive (magnetic disk or solid state), CD-ROM, and RAM are some examples of articles including a non-transitory computer-readable medium. For example, various computer programs 1725 or apps, such as one or more applications and modules implementing one or more of the methods illustrated and described herein or an app or application that executes on a mobile device or is accessible via a web browser, may be stored on a non-transitory computer-readable medium.

To better illustrate the method and apparatuses disclosed herein, a non-limiting list of embodiments is provided here.

Example 1 is a vehicle navigation system, the system comprising: a global navigation satellite system (GNSS) receiver to generate a plurality of GNSS locations; a signal of opportunity (SOOP) receiver to generate a plurality of SOOP pseudorange measurements from a plurality of SOOP pseudorange sources; a ranging odometry device to generate a plurality of ranging odometry data; and a processor configured to execute instructions to: determine a plurality of SOOP locations based on the plurality of GNSS locations and the plurality of SOOP pseudorange measurements; determine a GNSS unavailability; responsive to the GNSS unavailability, determine a vehicle location based on the plurality of ranging odometry data, the plurality of SOOP locations, and the plurality of SOOP pseudorange measurements.

In Example 2, the subject matter of Example 1 optionally includes wherein the processor is configured to execute further instructions to generate a plurality of extracted strategic feature points based on the plurality of ranging odometry data, wherein the plurality of extracted strategic feature points include a plurality of sharp edge points.

In Example 3, the subject matter of any one or more of Examples 1-2 optionally include wherein further responsive to the GNSS unavailability, the processor is configured to execute further instructions to generate a plurality of updated SOOP locations based on the plurality of ranging odometry data, the plurality of SOOP locations, and the plurality of SOOP pseudorange measurements.

In Example 4, the subject matter of any one or more of Examples 1-3 optionally include wherein: the plurality of ranging odometry data includes a plurality of ranging point clouds; and the processor is configured to execute further instructions to determine a plurality of relative vehicle position changes and relative vehicle orientation changes based on the plurality of ranging point clouds.

In Example 5, the subject matter of any one or more of Examples 1-4 optionally include wherein the ranging odometry device includes at least one of a light detection and ranging (lidar) device, a radar device, and a sonar device.

In Example 6, the subject matter of any one or more of Examples 1-5 optionally include wherein the determination of the plurality of SOOP locations includes an extended Kalman filter mapping determination of the plurality of SOOP locations based on the plurality of GNSS locations and the plurality of SOOP pseudorange measurements.

In Example 7, the subject matter of Example 6 optionally includes wherein the determination of the vehicle location includes an extended Kalman filter simultaneous localization and mapping (SLA) determination of the vehicle location based on the ranging point cloud, the plurality of SOOP locations, and the plurality of SOOP pseudorange measurements.

In Example 8, the subject matter of any one or more of Examples 1-7 optionally include wherein the processor is configured to execute further instructions to execute instructions to receive a plurality of initial SOOP locations, wherein the determination of the plurality of SOOP locations is further based on a modified iterative closest point analysis of the plurality of initial SOOP locations.

In Example 9, the subject matter of any one or more of Examples 1-8 optionally include wherein the plurality of SOOP pseudorange sources includes at least one of a plurality of broadcasting cellular towers.

Example 10 is a vehicle navigation method, the method comprising: generating a plurality of GNSS locations at a global navigation satellite system (GNSS) receiver; receiving a plurality of signal of opportunity (SOOP) signals from a plurality of SOOP pseudorange sources at a SOOP receiver; generating a plurality of SOOP pseudorange measurements at the SOOP receiver based on the plurality of SOOP signals; generating a plurality of ranging odometry data at a ranging odometry device; determining a plurality of SOOP locations based on the plurality of GNSS locations and the plurality of SOOP pseudorange measurements; determining a GNSS unavailability; responsive to the GNSS unavailability, determining a vehicle location based on the plurality of ranging odometry data, the plurality of SOOP locations, and the plurality of SOOP pseudorange measurements.

In Example 11, the subject matter of Example 10 optionally, includes generating a plurality of extracted strategic feature points based on the plurality of ranging odometry data, wherein the plurality of extracted strategic feature points include a plurality of sharp edge points.

In Example 12, the subject matter of any one or more of Examples 10-11 optionally include generating a plurality of updated SOOP locations based on the plurality of ranging odometry data, the plurality of SOOP locations, and the plurality of SOOP pseudorange measurements.

In Example 13, the subject matter of any one or more of Examples 10-12 optionally include wherein the plurality of ranging odometry data includes a plurality of ranging point clouds, the method further including determining a plurality of relative vehicle position changes and relative vehicle orientation changes based on the plurality of ranging point clouds.

In Example 14, the subject matter of any one or more of Examples 10-13 optionally include wherein the ranging odometry device includes at least one of a light detection and ranging (lidar) device, a radar device, and a sonar device.

In Example 15, the subject matter of any one or more of Examples 10-14 optionally include wherein the determination of the plurality of SOOP locations includes an extended Kalman filter mapping determination of the plurality of SOOP locations based on the plurality of GNSS locations and the plurality of SOOP pseudorange measurements.

In Example 16, the subject matter of Example 15 optionally, includes wherein the determination of the vehicle location includes an extended Kalman filter simultaneous localization and mapping (SLAM) determination of the vehicle location based on the ranging point cloud, the plurality of SOOP locations, and the plurality of SOOP pseudorange measurements.

In Example 17, the subject matter of any one or more of Examples 10-16 optionally include receiving a plurality of initial SOOP locations, wherein the determination of the plurality of SOOP locations is further based on a modified iterative closest point analysis of the plurality of initial SOOP locations.

In Example 18, the subject matter of any one or more of Examples 10-17 optionally include wherein the plurality of SOOP pseudorange sources includes at least one of a plurality of broadcasting cellular towers.

Example 19 is one or more machine-readable medium including instructions, which when executed by a computing system, cause the computing system to perform any of the methods of Examples 10-18.

Example 20 is an apparatus comprising means for performing any of the methods of Examples 10-18.

Example 21 is at least one non-transitory machine-readable storage medium, comprising a plurality of instructions that, responsive to being executed with processor circuitry of a computer-controlled device, cause the computer-controlled device to: generate a plurality of GNSS locations at a global navigation satellite system (GNSS) receiver; receive a plurality of signal of opportunity (SOOP) signals from a plurality of SOOP pseudorange sources at a SOOP receiver; generate a plurality of SOOP pseudorange measurements at the SOOP receiver based on the plurality of SOOP signals; generate a plurality of ranging odometry data at a ranging odometry device; determine a plurality of SOOP locations based on the plurality of GNSS locations and the plurality of SOOP pseudorange measurements; determine a GNSS unavailability; responsive to the GNSS unavailability, determine a vehicle location based on the plurality of ranging odometry data, the plurality of SOOP locations, and the plurality of SOOP pseudorange measurements.

In Example 22, the subject matter of Example 21 optionally includes the instructions further causing the computer-controlled device to generate a plurality of extracted strategic feature points based on the plurality of ranging odometry data, wherein the plurality of extracted strategic feature points include a plurality of sharp edge points.

In Example 23, the subject matter of any one or more of Examples 21-22 optionally include the instructions further causing the computer-controlled device to generate a plurality of updated SOOP locations based on the plurality of ranging odometry data, the plurality of SOOP locations, and the plurality of SOOP pseudorange measurements.

In Example 24, the subject matter of any one or more of Examples 21-23 optionally include wherein the plurality of ranging odometry data includes a plurality of ranging point clouds, the method the instructions further causing the computer-controlled device to determine a plurality of relative vehicle position changes and relative vehicle orientation changes based on the plurality of ranging point clouds.

In Example 25, the subject matter of any one or more of Examples 21-24 optionally include wherein the ranging odometry device includes at least one of a light detection and ranging (lidar) device, a radar device, and a sonar device.

In Example 26, the subject matter of any one or more of Examples 21-25 optionally include wherein the determination of the plurality of SOOP locations includes an extended Kalman filter mapping determination of the plurality of SOOP locations based on the plurality of GNSS locations and the plurality of SOOP pseudorange measurements.

In Example 27, the subject matter of Example 26 optionally includes wherein the determination of the vehicle location includes an extended Kalman filter simultaneous localization and mapping (SLAM) determination of the vehicle location based on the ranging point cloud, the plurality of SOOP locations, and the plurality of SOOP pseudorange measurements.

In Example 28, the subject matter of any one or more of Examples 21-27 optionally include the instructions further causing the computer-controlled device to receive a plurality of initial SOOP locations, wherein the determination of the plurality of SOOP locations is further based on a modified iterative closest point analysis of the plurality of initial SOOP locations.

In Example 29, the subject matter of any one or more of Examples 21-28 optionally include wherein the plurality of SOOP pseudorange sources includes at least one of a plurality of broadcasting cellular towers.

Example 30 is an vehicle navigation apparatus comprising: means for generating a plurality of GNSS locations at a global navigation satellite system (GNSS) receiver; means for receiving a plurality of signal of opportunity (SOOP) signals from a plurality of SOOT' pseudorange sources at a SOOP receiver; means for generating a plurality of SOOP pseudorange measurements at the SOOP receiver based on the plurality of SOOP signals; means for generating a plurality of ranging odometry data at a ranging odometry device; means for determining a plurality of SOOT' locations based on the plurality of GNSS locations and the plurality of SOOT' pseudorange measurements; means for determining a GNSS unavailability; means for responsive to the GNSS unavailability, determining a vehicle location based on the plurality of ranging odometry data, the plurality of SOOP locations, and the plurality of SOOT' pseudorange measurements.

In Example 31, the subject matter of Example 30 optionally includes means for generating a plurality of extracted strategic feature points based on the plurality of ranging odometry data, wherein the plurality of extracted strategic feature points include a plurality of sharp edge points.

In Example 32, the subject matter of any one or more of Examples 30-31 optionally include means for generating a plurality of updated SOOP locations based on the plurality of ranging odometry data, the plurality of SOOP locations, and the plurality of SOOP pseudorange measurements.

In Example 33, the subject matter of any one or more of Examples 30-32 optionally include wherein the plurality of ranging odometry data includes a plurality of ranging point clouds, the apparatus further including means for determining a plurality of relative vehicle position changes and relative vehicle orientation changes based on the plurality of ranging point clouds.

In Example 34, the subject matter of any one or more of Examples 30-33 optionally include wherein the ranging odometry device includes at least one of a light detection and ranging (lidar) device, a radar device, and a sonar device.

In Example 35, the subject matter of any one or more of Examples 30-34 optionally include wherein the determination of the plurality of SOOP locations includes an extended Kalman filter mapping determination of the plurality of SOOP locations based on the plurality of GNSS locations and the plurality of SOOP pseudorange measurements.

In Example 36, the subject matter of Example 35 optionally includes wherein the determination of the vehicle location includes an extended Kalman filter simultaneous localization and mapping (SLAM) determination of the vehicle location based on the ranging point cloud, the plurality of SOOP locations, and the plurality of SOOP pseudorange measurements.

In Example 37, the subject matter of any one or more of Examples 30-36 optionally include means for receiving a plurality of initial SOOP locations, wherein the determination of the plurality of SOOP locations is further based on a modified iterative closest point analysis of the plurality of initial SOOP locations.

In Example 38, the subject matter of any one or more of Examples 30-37 optionally include wherein the plurality of SOOP pseudorange sources includes at least one of a plurality of broadcasting cellular towers.

Example 39 is one or more non-transitory machine-readable medium including instructions, which when executed by a machine, cause the machine to perform operations of any of the operations of Examples 1-38.

Example 40 is an apparatus comprising means for performing any of the operations of Examples 1-38.

Example 41 is a system to perform the operations of any of the Examples 1-38.

Example 42 is a method to perform the operations of any of the Examples 1-38.

Each of these non-limiting examples can stand on its own, or can be combined in various permutations or combinations with one or more of the other examples.

Conventional terms in the fields of computer vision have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof) with respect to other examples one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A vehicle navigation system, the system comprising:
a global navigation satellite system (GNSS) receiver to generate a plurality of GNSS locations;
a signal of opportunity (SOOP) receiver to generate a plurality of SOOP pseudorange measurements from a plurality of SOOP pseudorange sources;
a ranging odometry device to generate a plurality of ranging odometry data; and
a processor configured to execute instructions to:
to receive a plurality of initial SOOP locations;
determine a plurality of SOOP locations based on the plurality of GNSS locations the plurality of SOOP pseudorange measurements, and a modified iterative closest point analysis of the plurality of initial SOOP locations;
determine a GNSS unavailability; and
responsive to the GNSS unavailability, determine a vehicle location based on the plurality of ranging odometry data, the plurality of SOOP locations, and the plurality of SOOP pseudorange measurements.

2. The vehicle navigation system of claim 1, wherein the processor is configured to execute further instructions to generate a plurality of extracted strategic feature points based on the plurality of ranging odometry data, wherein the plurality of extracted strategic feature points include a plurality of sharp edge points.

3. The vehicle navigation system of claim 1, wherein further responsive to the GNSS unavailability, the processor is configured to execute further instructions to generate a plurality of updated SOOP locations based on the plurality of ranging odometry data, the plurality of SOOP locations, and the plurality of SOOP pseudorange measurements.

4. The vehicle navigation system of claim 1, wherein:
the plurality of ranging odometry data includes a plurality of ranging point clouds; and
the processor is configured to execute further instructions to determine a plurality of relative vehicle position changes and relative vehicle orientation changes based on the plurality of ranging point clouds.

5. The vehicle navigation system of claim 1, wherein the ranging odometry device includes at least one of a light detection and ranging (lidar) device, a radar device, and a sonar device.

6. The vehicle navigation system of claim 1, wherein the determination of the plurality of SOOP locations includes an extended Kalman filter mapping determination of the plurality of SOOP locations based on the plurality of GNSS locations and the plurality of SOOP pseudorange measurements.

7. The vehicle navigation system of claim 1, wherein the determination of the vehicle location includes an extended Kalman filter simultaneous localization and mapping (SLAM) determination of the vehicle location based on a plurality of ranging point clouds, the plurality of SOOP locations, and the plurality of SOOP pseudorange measurements.

8. The vehicle navigation system of claim 1, wherein the plurality of SOOP pseudorange sources includes at least one of a plurality of broadcasting cellular towers.

9. A vehicle navigation method, the method comprising:
generating a plurality of GNSS locations at a global navigation satellite system (GNSS) receiver;
receiving a plurality of signal of opportunity (SOOP) signals from a plurality of SOOP pseudorange sources at a SOOP receiver;
generating a plurality of SOOP pseudorange measurements at the SOOP receiver based on the plurality of SOOP signals;
generating a plurality of ranging odometry data at a ranging odometry device;
receiving a plurality of initial SOOP locations;
determining a plurality of SOOP locations based on the plurality of GNSS locations, the plurality of SOOP pseudorange measurements, and a modified iterative closest point analysis of the plurality of initial SOOP locations;
determining a GNSS unavailability; and
responsive to the (INSS unavailability, determining a vehicle location based on the plurality of ranging odometry data, the plurality of SOOP locations, and the plurality of SOOP pseudorange measurements.

10. The vehicle navigation method of claim 9, further including generating a plurality of extracted strategic feature points based on the plurality of ranging odometry data, wherein the plurality of extracted strategic feature points include a plurality of sharp edge points.

11. The vehicle navigation method of claim 9, further including generating a plurality of updated SOOP locations based on the plurality of ranging odometry data, the plurality of SOOP locations, and the plurality of SOOP pseudorange measurements.

12. The vehicle navigation method of claim 9, wherein the plurality of ranging odometry data includes a plurality of ranging point clouds, the method further including determining a plurality of relative vehicle position changes and relative vehicle orientation changes based on the plurality of ranging point clouds.

13. The vehicle navigation method of claim 9, wherein the ranging odometry device includes at least one of a light detection and ranging (lidar) device, a radar device, and a sonar device.

14. The vehicle navigation method of claim 9, wherein the determination of the plurality of SOOP locations includes an extended Kalman filter mapping determination of the plurality of SOOP locations based on the plurality of GNSS locations and the plurality of SOOP pseudorange measurements.

15. The vehicle navigation method of claim 9, wherein the determination of the vehicle location includes an extended Kalman filter simultaneous localization and mapping (SLAM) determination of the vehicle location based on a plurality of ranging point clouds, the plurality of SOOP locations, and the plurality of SOOP pseudorange measurements.

16. The vehicle navigation method of claim 9, wherein the plurality of SOOP pseudorange sources includes at least one of a plurality of broadcasting cellular towers.

17. At least one non-transitory machine-readable storage medium, comprising a plurality of instructions that, responsive to being executed with processor circuitry of a computer-controlled device, cause the computer-controlled device to:
generate a plurality of GNSS locations at a global navigation satellite system (CiNSS) receiver;
receive a plurality of signal of opportunity (SOOP) signals from a plurality of SOOP pseudorange sources at a SOOP receiver;
generate a plurality of SOOP pseudorange measurements at the SOOP receiver based on the plurality of SOOP signals;
generate a plurality of ranging odometry data at a ranging odometry device;
receive a plurality of initial SOOP locations;
determine a plurality of SOOP locations based on the plurality of GNSS locations, the plurality of SOOP pseudorange measurements, and a modified iterative closest point analysis of the plurality of initial SOOP locations;
determine a GNSS unavailability; and
responsive to the GNSS unavailability, determine a vehicle location based on the plurality of ranging odometry data, the plurality of SOOP locations, and the plurality of SOOP pseudorange measurements.

18. The storage medium of claim 17, the instructions further causing the computer-controlled device to generate a plurality of extracted strategic feature points based on the plurality of ranging odometry data, wherein the plurality of extracted strategic feature points include a plurality of sharp edge points.

* * * * *